US011803415B2

(12) United States Patent
Dunn et al.

(10) Patent No.: US 11,803,415 B2
(45) Date of Patent: Oct. 31, 2023

(54) AUTOMATING TASKS FOR A USER ACROSS THEIR MOBILE APPLICATIONS

(71) Applicant: Microsoft Technology Licensing, LLC, Redmond, WA (US)

(72) Inventors: Micheal Dunn, Redmond, WA (US); Gerald Haslhofer, Bellevue, WA (US); Timothy C. Franklin, Seattle, WA (US); Nabeei Shahzad, Sammamish, WA (US); Aarohi Arora, Redmond, WA (US); Deyuan Ke, Redmond, WA (US); Valentina I. Strachan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/836,199

(22) Filed: Mar. 31, 2020

(65) Prior Publication Data

US 2021/0303342 A1 Sep. 30, 2021

(51) Int. Cl.
*G06F 9/48* (2006.01)
*G06F 40/174* (2020.01)
*G06F 3/0481* (2022.01)
*G06F 3/0484* (2022.01)

(52) U.S. Cl.
CPC .......... *G06F 9/4881* (2013.01); *G06F 3/0481* (2013.01); *G06F 3/0484* (2013.01); *G06F 40/174* (2020.01)

(58) Field of Classification Search
CPC ...... G06F 40/35; G06F 9/4881; G06F 3/0481; G06F 3/0484; G06F 40/174; G10L 13/02; G10L 15/063; G10L 15/1815; G10L 15/22; G10L 15/30; G10L 2015/223; G10L 2015/228
See application file for complete search history.

(56) References Cited

U.S. PATENT DOCUMENTS

| 8,655,952 | B1 | 2/2014 | Schilit |
| 8,825,510 | B2 | 9/2014 | Hamilton et al. |
| 10,354,011 | B2 | 7/2019 | Nell et al. |
| 10,740,603 | B2 * | 8/2020 | Davis ..................... G06V 30/15 |

(Continued)

OTHER PUBLICATIONS

"WinAppDriver UI Recorder", Retrieved From: https://github.com/Microsoft/WinAppDriver/wiki/WinAppDriver-UI-Recorder, Jun. 21, 2018, 2 Pages.

(Continued)

*Primary Examiner* — Tan H Tran
(74) *Attorney, Agent, or Firm* — Faegre Drinker Biddle & Reath LLP

(57) ABSTRACT

Methods and systems are provided that leverage existing information displayed or presented to a user by an app without requiring the integration of new libraries or requiring a user to use a specific app. Rather, methods and systems presented herein identify a task, select an app or multiple apps capable of performing the task, obtain information that may be required by the app or apps, determine a contextual understanding of what is displayed by the selected app or apps, and finally generate and automate the interaction with the app or apps such that the interaction with the app or apps is handled by an automation agent, allowing a user to stay focused on one or more tasks that the user needs to accomplish.

14 Claims, 19 Drawing Sheets

(56) References Cited

U.S. PATENT DOCUMENTS

| | | | |
|---|---|---|---|
| 10,838,779 B1* | 11/2020 | Yue | G06F 16/168 |
| 10,854,191 B1* | 12/2020 | Geramifard | G10L 15/01 |
| 2004/0181749 A1* | 9/2004 | Chellapilla | G06V 30/412 |
| | | | 715/222 |
| 2012/0016678 A1* | 1/2012 | Gruber | G10L 15/183 |
| | | | 704/275 |
| 2017/0099592 A1 | 4/2017 | Loeb et al. | |
| 2017/0132199 A1 | 5/2017 | Vescovi et al. | |
| 2017/0358303 A1* | 12/2017 | Walker, II | G10L 13/02 |
| 2019/0014070 A1 | 1/2019 | Mertvetsov et al. | |
| 2019/0129749 A1 | 5/2019 | White et al. | |
| 2019/0377619 A1 | 12/2019 | Riva et al. | |
| 2019/0384699 A1 | 12/2019 | Arbon et al. | |
| 2020/0312299 A1* | 10/2020 | Nama | G06F 16/3329 |

OTHER PUBLICATIONS

Vinyals, et al., "AlphaStar: Mastering the Real-Time Strategy Game StarCraft II", Retrieved From: https://deepmind.com/blog/article/alphastar-mastering-real-time-strategy-game-starcraft-ii, Jan. 24, 2019, 18 Pages.

Watters, et al., "COBRA: Data-Efficient Model-Based RL through Unsupervised Object Discovery and Curiosity-Driven Exploration", In Repository of arXiv preprint arXiv:1905.09275, May 22, 2019, 24 Pages.

Wiggers, Kyle, "Google Duplex for the Web can Reserve Rental Cars and Movie Tickets", Retrieved From: https://venturebeat.com/2019/05/07/google-duplex-for-the-web-can-reserve-rental-cars-and-movie-tickets/, May 7, 2019, 4 Pages.

Yamanaka, et al., "Fast and Accurate Image Super Resolution by Deep CNN with Skip Connection and Network in Network", Retrieved From: https://github.com/jiny2001/dcscn-super-resolution, Retrieved Date: Dec. 13, 2019, 8 Pages.

Yeo, et al., "How to use Named Entity Recognition in Text Analytics", Retrieved From: https://docs.microsoft.com/en-us/azure/cognitive-services/text-analytics/how-tos/text-analytics-how-to-entity-linking, Feb. 10, 2020, 7 Pages.

Yu, et al., "Deeplab on TPU", Retrieved From: https://github.com/tensorflow/tpu/blob/master/models/experimental/deeplab/README.md, Retrieved Date: Dec. 13, 2019, 2 Pages.

"Ambient Intelligence", Retrieved rom: https://microsoft.sharepoint.com/sites/mslibrary/KeyTopics/Pages/Research/Ambient%20Intelligence.pdf, Jul. 18, 2019, 16 Pages.

"Bodypix", Retrieved From: https://web.archive.org/web/20190217032917/https:/storage.googleapis.com/tfjs-models/demos/body-pix/index.html, Feb. 17, 2019, 1 Page.

"BodyPix—Person Segmentation in the Browser", Retrieved From: https://web.archive.org/web/20191121165307/https:/github.com/tensorflow/tfjs-models/tree/master/body-pix, Nov. 21, 2019, 15 Pages.

"DeepLab-v3-plus Semantic Segmentation in TensorFlow", Retrieved From: https://github.com/rishizek/tensorflow-deeplab-v3-plus, Nov. 17, 2019, 4 Pages.

"Get Started with System Voice Actions", Retrieved From: https://web.archive.org/web/20170115051057/https:/developers.google.com/voice-actions/system/, Jan. 15, 2017, 8 Pages.

"Getting Started with Gym", Retrieved From: https://gym.openai.com/docs/, Retrieved From: Dec. 13, 2019, 8 Pages.

"Instance Segmentation in Google Colab with Custom Dataset", Retrieved From: https://hackernoon.com/instance-segmentation-in-google-colab-with-custom-dataset-b3099ac23f35, Sep. 11, 2018, 9 Pages.

"Natural Language", Retrieved From: https://web.archive.org/web/20191222222049/https:/cloud.google.com/natural-language/, Dec. 22, 2019, 13 Pages.

"Running Deeplab-v3 on Cloud TPU", Retrieved From: https://cloud.google.com/tpu/docs/tutorials/deeplab, Retrieved Date: Dec. 13, 2019, 9 Pages.

"StreetLearn", Retrieved From: https://github.com/deepmind/streetlearn, Retrieved From: Dec. 13, 2019, 7 Pages.

"StreetLearn Code", Retrieved From: https://sites.google.com/view/streetlearn/code?authuser=0, Retrieved Date: Dec. 13, 2019, 10 Pages.

"Text Summarization API Documentation", Retrieved From: https://rapidapi.com/textanalysis/api/text-summarization/, Retrieved Date: December, 2 Pages.

"The Cityscapes Dataset", Retrieved From: https://www.cityscapes-dataset.com/, Retrieved From: Dec. 13, 2019, 4 Pages.

"The Power of Voice—Lyra is the only personal assistant you need", Retrieved From: https://web.archive.org/web/20170822101027/https:/www.heylyra.com/, Aug. 22, 2017, 13 Pages.

"The UiPath Platform Simplifies Digital Transformation by Rapidly Automating Processes", Retrieved From: https://www.uipath.com/product/platform, Dec. 13, 2019, 9 Pages.

"Welcome to AirSim", Retrieved From: https://web.archive.org/web/20190218125237/https:/microsoft.github.io/AirSim/, Feb. 18, 2019, 6 Pages.

"What is RPA? Everything you Need to Know", Retrieved From: https://internetofthingsagenda.techtarget.com/definition/robotic-process-automation, Retrieved From: Dec. 13, 2019, 8 Pages.

Bazarevsky, Valentin, "Mobile Real-Time Video Segmentation", Retrieved From: https://ai.googleblog.com/2018/03/mobile-real-time-video-segmentation.html, Mar. 1, 2018, 6 Pages.

Castellanos, Sara, "Biohacking Joins AI, Blockchain Among Technologies to Bring Competitive Edge", Retrieved From: https://blogs.wsj.com/cio/2018/08/23/biohacking-joins-ai-blockchain-among-technologies-to-bring-competitive-edge/. Aug. 23, 2018, 2 Pages.

Chen, et al., "Semantic Image Segmentation with DeepLab in TensorFlow", Retrieved From: https://ai.googleblog.com/2018/03/semantic-image-segmentation-with.html, Mar. 12, 2018, 3 Pages.

Chilamkurthy, Sasank, "A 2017 Guide to Semantic Segmentation with Deep Learning", Retrieved From: http://blog.qure.ai/notes/semantic-segmentation-deep-learning-review, Jul. 5, 2017, 15 Pages.

Cohen, Vanya, "OpenGPT-2: We Replicated GPT-2 Because You Can Too", Retrieved From: https://blog.usejournal.com/opengpt-2-we-replicated-gpt-2-because-you-can-too-45e34e6d36dc, Aug. 22, 2019, 6 Pages.

Erol, et al., "Linking Multimedia Presentations with their Symbolic Souice Documents: Algorithm and Applications", In Proceedings of the eleventh ACM international conference on Multimedia, Nov. 2, 2003, 10 Pages.

Florensa, et al., "Self-Supervised Learning of Image Embedding for Continuous Control", In Journal of Computing Research Repository, Jan. 3, 2019, 11 Pages.

Foley, Mary Jo., "Move over, Amazon: Microsoft has an Autonomous Systems and Robotics Strategy, too", Retrieved from: https://www.zdnet.com/article/move-over-amazon-microsoft-has-an-autonomous-systems-and-robotics-strategy-tool, Jun. 3, 2019, 14 Pages.

Genthial, et al., "Tensorflow—Named Entity Recognition", Retrieved From: https://github.com/guillaumegenthial/tf_ner. Retrieved From: Dec. 13, 2019, 4 Pages.

Gur, et al., "Learning to Navigate the Web", In Proceedings of the 7th International Conference on Learning Representations, Dec. 21, 2018, 12 Pages.

He, et al., "Mask R-CNN", In Journal of Computing Research Repository, Mar. 20, 2017, 12 Pages.

Honnibal, et al., "Introducing spaCy v2.1", Retrieved From: https://explosion.ai/blog/spacy-v2-1, Mar. 18, 2019, 15 Pages.

Ippolito, Pier Paolo., "Robotic Process Automation (RPA) Using UIPath", Retrieved From: https://towardsdatascience.com/robotic-process-automation-rpa-using-uipath-7b4645aeea5a, Apr. 26, 2019, 5 Pages.

Iqbal, et al., "Virtual Assistant Overview", Retrieved From: https://docs.microsoft.com/en-us/azure/bot-service/bot-builder-virtual-assistant-introduction?view=azure-bot-service-4.0, May 23, 2019, 6 Pages.

Isola, et al., "Image-to-Image Translation with Conditional Adversarial Network", In Proceedings of the IEEE Conference on Computer Vision and Pattern Recognition, 2017, pp. 1125-1134.

Jonze, Spike, "Her", Retrieved From: https://www.netflix.com/in/title/70278933?source=35, Retrieved Date: Dec. 13, 2019, 3 Pages.

(56) References Cited

OTHER PUBLICATIONS

Le, James, "How to do Semantic Segmentation using Deep Learning", Retrieved From: https://medium.com/nanonets/how-to-do-image-segmentation-using-deep-learning-c673cc5862ef, May 3, 2018, 14 Pages.

Liu, et al., "Reinforcement Learning on Web Interfaces using Workflow-Guided Exploration", In Proceedings of the 6th International Conference on Learning Representations, Apr. 30, 2018, 15 Pages.

Long, et al., "Fully Convolutional Networks for Semantic Segmentation", In Proceedings of the IEEE Conference on Computer Vision and Pattern Recognition, Jun. 7, 2015, 10 Pages.

Massa, et al., "Faster R-CNN and Mask R-CNN in PyTorch 1.0", Retrieved From: https://web.archive.org/web/20181128171708/https://github.com/facebookresearch/maskrcnn-benchmark?utm_source=mybridge&utm_medium=blog&utm_campaign=read_more, Nov. 28, 2018, 5 Pages.

Mikolov, et al., "Distributed Representations of Words and Phrases and their Compositionality", In iting Research Repository, Oct. 16, 2013, 9 Pages.

Mirowski, et al., "Learning to Navigate in Cities Without a Map", In Proceedings of the Advances in Neural Information Processing Systems, Mar. 29, 2018, 12 Pages.

Mnih, et al., "Playing Atari with Deep Reinforcement Learning", In Journal of Computing Research Repository, Jan. 1, 2013, 10 Pages.

Nowaczynski, Arkadiusz, "Deep learning for Satellite Imagery via Image Segmentation", Retrieved From: https://deepsense.ai/deep-learning-for-satellite-imagery-via-image-segmentation/, Apr. 12, 2017, 14 Pages.

Redmon, Joseph, "YOLO: Real-Time Object Detection", Retrieved From: https://web.archive.org/web/20191230231031/https:/pjreddie.com/darknet/yolo/, Dec. 30, 2019, 9 Pages.

Redmon, et al., "YOLOv3: An Incremental Improvement", In Journal of Computer Vision and Pattern Recognition, Apr. 8, 2018, 6 Pages.

Roth, Craig, "AI and Robots in the Workplace", Retrieved From: https://www.gartner.com/en/webinars/3881971/ai-and-robots-in-the-workplace, Retrieved Date: Dec. 13, 2019, 2 Pages.

Roth, Craig, "What I Want From AI at Work: A Secretary and an Intern", Retrieved From: https://blogs.gartner.com/craig-roth/2017/07/19/what-i-want-from-ai-at-work-a-secretary-and-an-intern/, Jul. 19, 2017, 4 Pages.

Sahu, Beeren, "How to Use DeepLab in TensorFlow for Object Segmentation using Deep Learning", Retrieved From: https://www.freecodecamp.org/news/how-to-use-deeplab-in-tensorflow-for-object-segmentation-using-deep-learning-a5777290ab6b/, Sep. 24, 2018, 9 Pages.

Sahu, Beeren, "The Evolution of Deeplab for Semantic Segmentation", Retrieved From: https://towardsdatascience.com/the-evolution-of-deeplab-for-semantic-segmentation-95082b025571, Jul. 12, 2019, 9 Pages.

Seif, George, "Semantic Segmentation with Deep Learning", Retrieved From: https://towardsdatascience.com/semantic-segmentation-with-deep-learning-a-guide-and-code-e52fc8958823, Sep. 19, 2018, 12 Pages.

Sullivan, Mark, "In an Era of Distractions, Microsoft wants AI to be your Coworker", Retrieved From: https://www.fastcompany.com/90401814/microsoft-is-designing-ai-powered-next-gen-tools-for-the-age-of-distraction, Sep. 18, 2019, 6 Pages.

Tsang, Sik-Ho, "Review: YOLOv3—You Only Look Once (Object Detection)", Retrieved From: https://towardsdatascience.com/review-yolov3-you-only-look-once-object-detection-eab75d7a1ba6, Feb. 8, 2019, 9 Pages.

"International Search Report and Written Opinion Issued in PCT Application No. PCT/US2021/016991", dated May 28, 2021, 16 Pages.

* cited by examiner

AUTOMATING TASKS FOR A USER ACROSS THEIR MOBILE APPLICATIONS

BACKGROUND

Today people are drowning in information, communications, and apps. Technology tends to drive user's lives instead of technology making user's lives richer. Even worse people tend to lose control of their time and focus and end up focusing on task coordination, task flow, and task management instead of task completion. To solve the problem, one might hire a personal secretary to help manage the deluge of information, apps, and communications to ensure that focus is placed on the most important things and people. However, it is impractical to have a secretary manage one or more applications on a user's device in real-time.

SUMMARY

In accordance with examples of the present disclosure, methods and systems are described that allow users to utilize existing apps on their mobile device while providing a mechanism to orchestrate the automation of such apps to accomplish tasks for the users without direct interaction from the users. Moreover, such methods and system leverage existing information displayed or presented to the user and do not require an integration of a new library or require the user to use a specific app. Rather, methods and systems presented herein identify a task, select an app or multiple apps capable of performing the task, obtain information that may be required by the app or apps, determine a contextual understanding of what is displayed by the selected app or apps, and finally generate and automate the interaction with the app or apps such that the interaction with the app or apps is handled by an automation agent, allowing a user to stay focused on one or more tasks that the user needs to accomplish.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
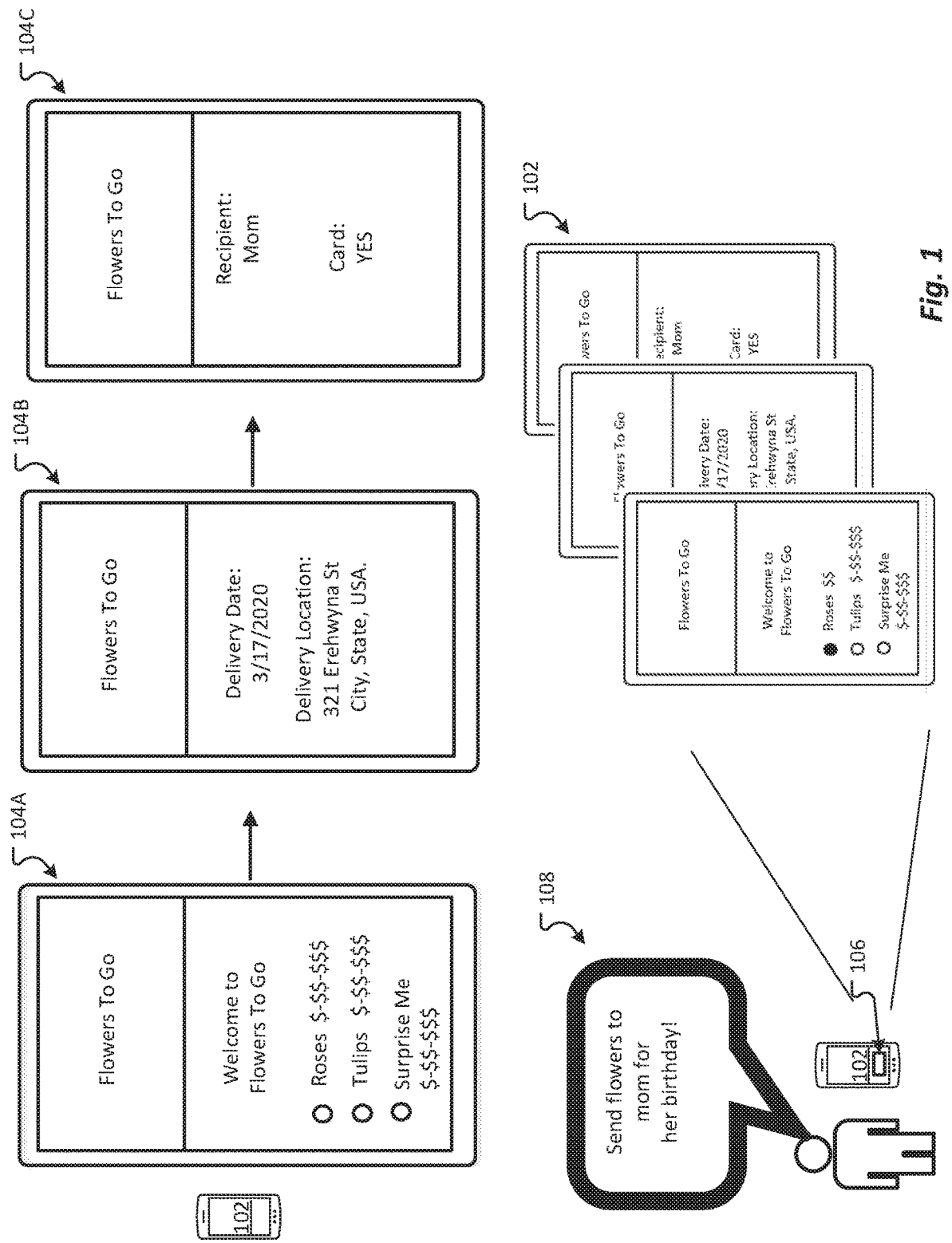
FIG. 1 depicts details directed to an example for automating an app or browser of a mobile device of a user to complete one or more tasks in accordance with examples of the present disclosure.

FIG. 1 depicts details directed to an example for automating tasks on a mobile device of a user in accordance with examples of the present disclosure. A user may interact with an app and/or web application running or otherwise executing on a mobile device 102 to accomplish one or more tasks or actions. As one non-limiting example, a user may desire to order flowers utilizing an app running on the mobile device 102. As depicted in FIG. 1, the app may cause user interfaces 104A-104C to be displayed at the mobile device 102. The user may interact with the user interfaces 104A-104C of the app to provide various inputs to the app and view information. For example, the user may select a type of flowers in the user interface 104A, a recipient for the flowers in the user interface 104C, a delivery location for the flowers in the user interface 104B, an amount to spend for the flowers in the user interface 104A, a delivery date in the user interface 104B, and/or whether or not to include a card in the user interface 104C. Interacting with the user interfaces 104A-104C allows the user to provide pertinent information needed for accomplishing the task, or action, of ordering flowers. However, the user's interaction with the app is generally to provide information that is already available or accessible on the mobile device 120 and/or observed over time. For example, the user interacting with the app may always choose an amount to spend in the $$ category. As another example, the address for the user's mother may reside in as a contact in a contact list. As another example, the delivery date for the flowers may be determined based on a birthday entry associated with the contact entry for the user's mother in the contact list. Accordingly, much of the information for interacting with the app can be accessed, found, or otherwise obtained from information residing on the user's mobile device 102 and/or from past interactions of the user with the mobile device 102.

In accordance with examples of the present disclosure, an automation agent 106 running on the mobile device 102 may automate the process of interacting with one or more applications running on the mobile device 102. Stated another way, a user may provide a minimal amount of information to the mobile device 102 to accomplish a task or action such that a task intent can be recognized and/or determined. An automation agent 106 running on the mobile device 102 may then obtain information from various sources, including other apps running on the mobile device 102, and provide such information required by one or more applications directly to the app to accomplish a desired task or action. As one non-limiting example, and continuing with the flower example above, the user may provide a speech input 108 to the mobile device 102 such as "Send flowers to mom for her birthday." The automation agent 106 running on the mobile device 102 and/or in the cloud may process the speech directly and/or receive processed speech from an existing application running on the mobile device 102. The automation agent 106 may then determine a task intent, such as the user desires to order flowers for the user's mother for the user's mother's birthday. Accordingly, the automation agent 106 may identify one or more task models for accomplishing the task indicated by the task intent and to obtain the requisite information for ordering flowers, from existing application models, previous user preferences, and/or directly from the user for example. The automation agent may identify an application to accomplish the task intent and an application model based on the identified application; the automation agent 106 may also populate an action graph based on the application model, and once all the requisite information is obtained, interact with one or more user interfaces 104A-104C of the app to place a flower order, mimicking one or more user actions for interacting with the one or more user interfaces 104A-104C of the app. That is, the automation agent 106 may automatically interact with a contact list app on the mobile device 102 to obtain the address of the user's mother; access a data store and/or historical information to determine how much to spend on the flowers; automatically select an option to include a birthday card based on information in a user profile; automatically choose the type of flowers, and/or arrangement of flowers based on one or more data sources having information associated with the user's mother; and utilize a payment method to pay for the order. In instances where multiple apps and/or multiple websites may exist for accomplishing the task or action, the automation agent 106 may choose the method preferred by the user. Alternatively, or in addition, questions presented typically throughout an application, such as in each panel of a user interface of an app, may be condensed and presented to a user in a simple upfront user interface and/or default selections for questions, items, or otherwise may be obtained from previous user preferences. Accordingly, the automation agent 106 may identify the requisite information for ordering flowers, obtain the requisite information from previous user preferences and/or from an upfront display presented to the user; once all the requisite information is obtained, the automation agent 106 may interact with one or more user interfaces 104A-104C of the app to place a flower order, mimicking one or more user actions for interacting with the one or more user interfaces 104A-104C of the app. That is, the automation agent 106 may present questions or selections needing user input upfront, obtain user address information from a user preference information store for example to obtain the address of the user's mother; determine how much to spend on the flowers; include a birthday card; choose the type of flowers, and/or arrangement of flowers; and utilize a payment method to pay for the order. In instances where multiple apps and/or multiple websites may exist for accomplishing the task or action, the automation agent 106 may choose the method preferred by the user.

Figure 2:
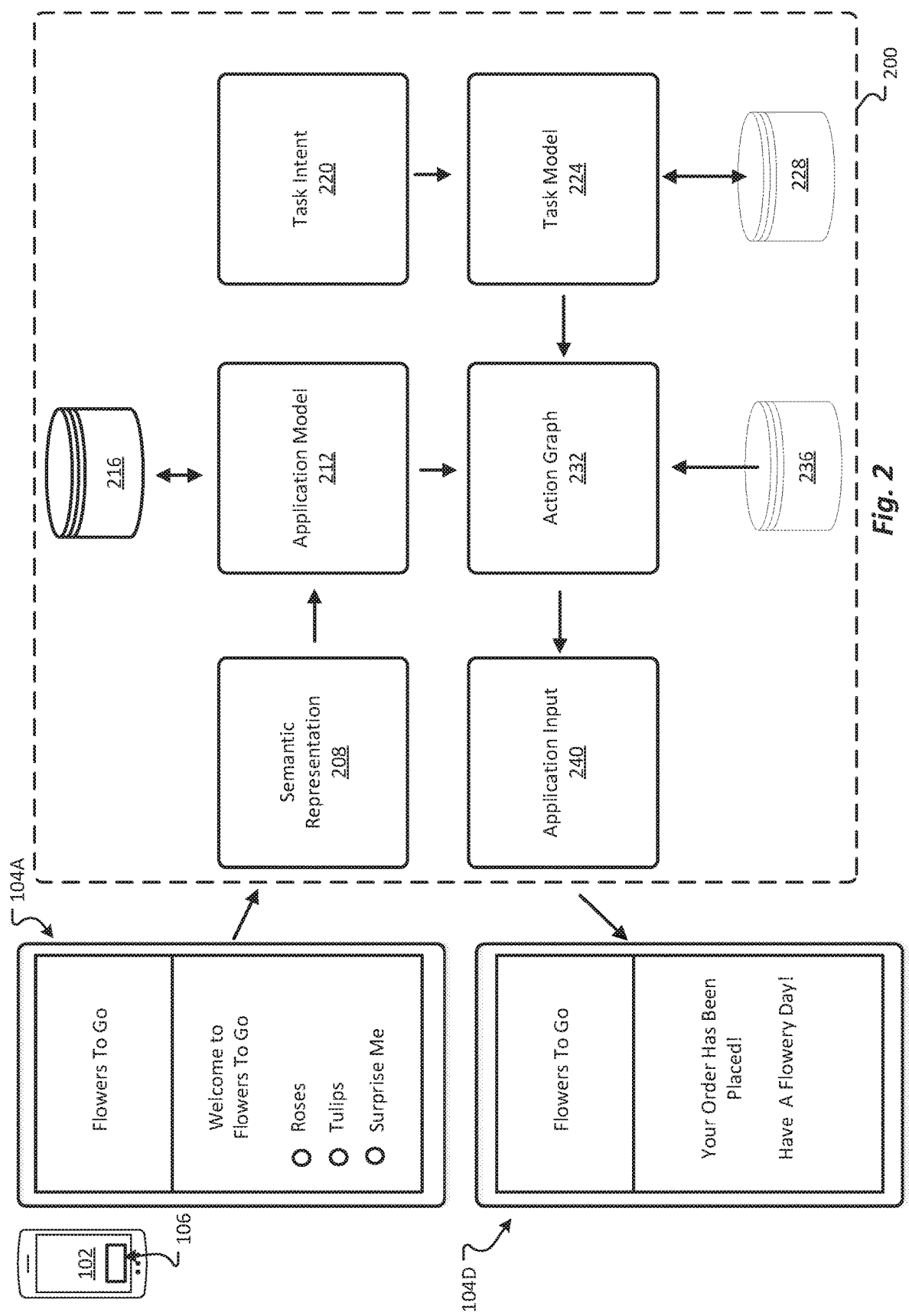
FIG. 2 depicts details of a system for automating apps or browser of a mobile device of a user to complete one or more tasks in accordance with examples of the present disclosure.

FIG. 2 depicts a system 200 for automating tasks on a mobile device of a user in accordance with examples of the present disclosure. To facilitate the task automation process, the system 200 may generate an application model for interacting with a specific, or generic, app. For example, the system 200 may receive an app, such as the app running on the mobile device 102, generate a semantic representation of the app, and generate an application model based on the semantic representation of the app, where the application model includes information describing a general flow of the app, inputs needed for the app, outputs from the app, and the location and placement of objects, both interactive or otherwise. As will be discussed further, the semantic representation of the app may be generated utilizing one or more user interfaces; as depicted in FIG. 2, screenshots or graphical representations of each user interface displayed to a user of the app may be utilized. Utilizing pixel data from the screenshot or graphical representation, one or more optical character processing techniques may identify elements displayed to the user to generate a semantic representation of the app, where the semantic representation of the app may describe each element of the user interface provided to the user; based on the description of each element, an application model 212 may be developed for an app, where the application model 212 may describe, or model, the app, including the app flow from user interface to user interface, the inputs needed, and/or any notifications or outputs provided to the user. That is, the application model 212 may include a representation of each user interface provided to a user; one or more pieces of information that may be required by the app and provided by the user; a process or flow of the application for accomplishing one or more tasks; and/or may utilize an existing app, such as the app running on the mobile device 102 to obtain additional information prior to, or instead of, requesting such information from the user. For example, the application model 212 may determine that a specific user interface displayed to the user may be requesting a location, such as an address. Rather than requiring the user to enter the address information needed by the app, the automation agent 106 may access the address from a contact list for example, where the address accessed is specific to the identified task or action. The application model 212 may be stored at the storage location 216 for retrieval.

The system 200 may also include determining a task intent 220 from the user provided input such that the appropriate application for the task can be identified and utilized. For example, the automation agent 106 may determine a task intent 220 based on input provided by the user or provided by the user's mobile device 102. For example, a task intent may be generated from an appointment in a user's calendar and may be coupled to or otherwise associated with a location, such as a conference room location or entity. That is, a data store including one or more appointments may be accessed and a data store including one or more conference rooms and/or conferences room locations may be accessed; based on the appointment and a location of the mobile device 102 in relation to a location associated with the appointment, one or more task intents, such as "attend meeting", may be identified. Thus, based on the task intent 220, a task model for accomplishing the task intent 220 may be determined and/or retrieved. As another non-limiting example, semantic and/or textual analysis of a user supplied input, such as "Send flowers to mom for her birthday" may be performed such that the task intent 220, "send flowers," may be identified. In some examples, natural language processing and/or natural language understanding may be utilized to determine a task intent. Accordingly, a task model 224, specific to the task intent 220, may be retrieved from a storage location 228, such as a database. In examples where a task model does not exist for a determined task intent, a generic task model, or a similar task model, may be utilized based on a similar task intent. In instances where a task model is newly created, the task model 224 may be stored at the storage location 228, such as at a database. The task model 224 may include one or more subtasks. For example, the task model 224 may break a task intent of "send flowers" to the subtask of (1) determine who the flowers are to be delivered to; (2) determine an address or location to send the flowers to; (3) determine when the flowers are to be delivered; (4) determine what kind of flowers to send; (5) determine how much to spend on the flowers; (6) determine a vendor app to use to purchase the flowers; and (7) determine if there are to be any additions to the flower order, such as a card, vase, etc. For each subtask, a task intent 220 and/or a task model 224 maybe determined.

Based on the task model 224, requisite information to complete each subtask and therefore the task may be identified and retrieved. For example, a delivery location, recipient, kind/type of flowers, etc. may be retrieved from a storage location 236. In some aspects, such data may be retrieved by utilizing a different app, such as a contact list, a calendar, etc. Based on the application model 212, an application graph 232 including the requisite information may be generated. The application graph 232 is generated based on the application model 212 and requisite data from the repository or storage location 236; that is, the application graph 232 assembles processes and data together for executing the task intent 220 based on the task model 224. Once the application graph 232 is assembled, application input 240 may be provided to the app. That is, the application input 240 may mimic a user entering data, selecting one or more entities, and continuing through one or more user interfaces, such as user interfaces 140A-D.

Figure 3A:
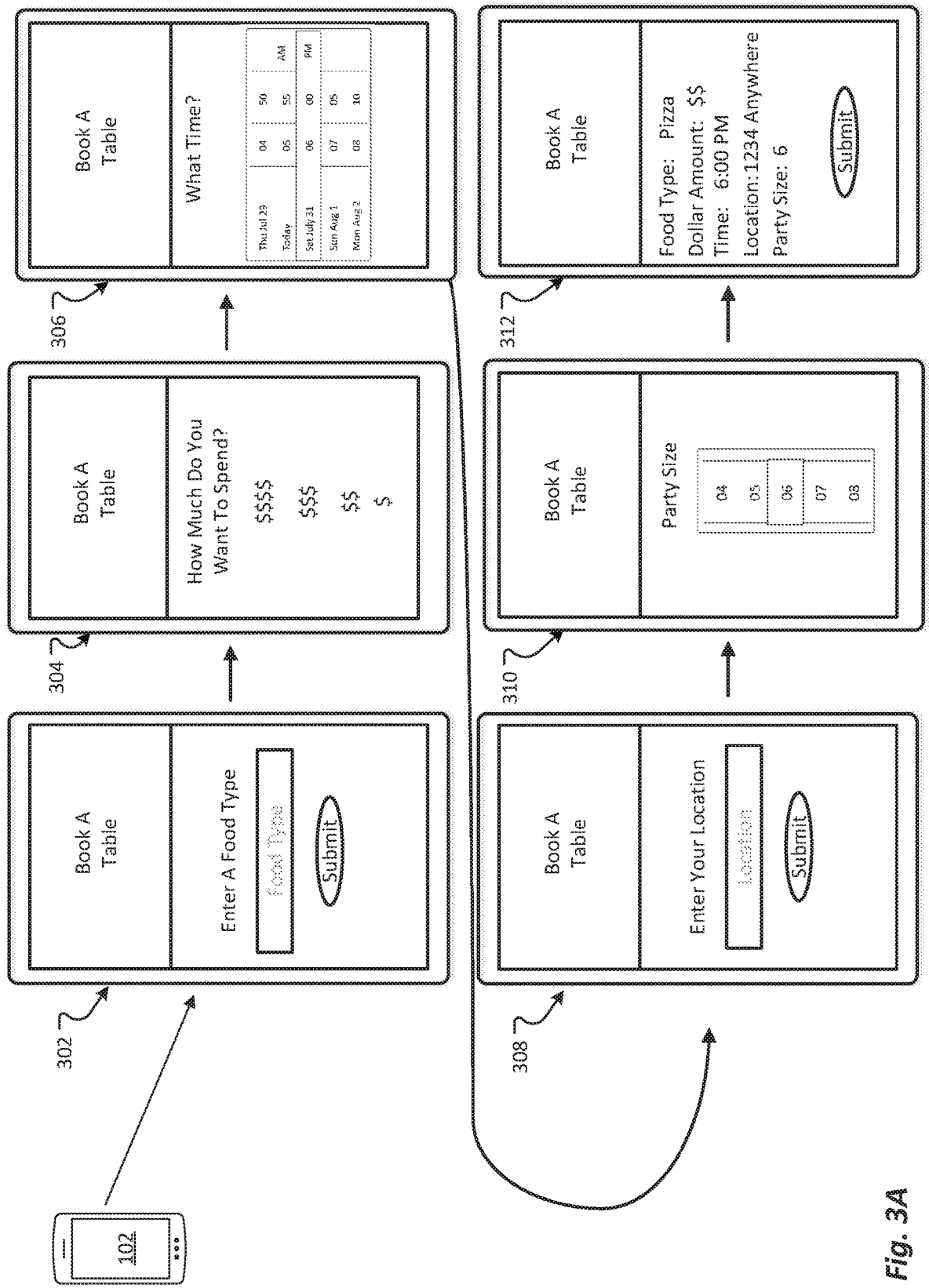
FIG. 3A depicts details of an app for booking a reservation at a restaurant utilizing a mobile device.

FIG. 3A provides a first example panel by panel of a user driven action of an app for booking a reservation at a restaurant utilizing the mobile device 102. The app may include a user interface 302 where a user may be prompted for a food type and may need to select the "submit" option to continue on to the next screen. The app may include a user interface 304 where a user may be prompted to select an expense category or representative amount they would like to spend at the restaurant. For example, a user is likely to spend more for a corresponding to two dollar signs than a category corresponding to a single dollar sign. The app may include a user interface 306 where a user may be prompted to provide an input designating a date and time for the reservation. For example, the input may be entered utilizing a piker wheel type entity as displayed in the user interface 306. The app may include a user interface 308 where a user may be prompted to enter a reservation location. In some examples, the reservation location may be a city and state, in other examples, the reservation location may be an area of a town. The app may include a user interface 310 where a user may be prompted to enter a party size associated with the reservation. As one example, the input may be entered utilizing a piker wheel type entity as displayed in the user interface 310. The app may include a user interface 312 where a summary of the inputs may be provided or otherwise displayed to the user such that a user may confirm the criteria for a reservation. In some examples, instead of a summary of inputs, one or more restaurants matching, or closely matching, one or more of the input criteria from user interfaces 302-310 may be displayed. While a flow of user interfaces is generally provided in FIG. 3A, it should be understood that other user interfaces may be displayed and/or the order of user interfaces may be different from that which is displayed in FIG. 3A.

Figure 3B:
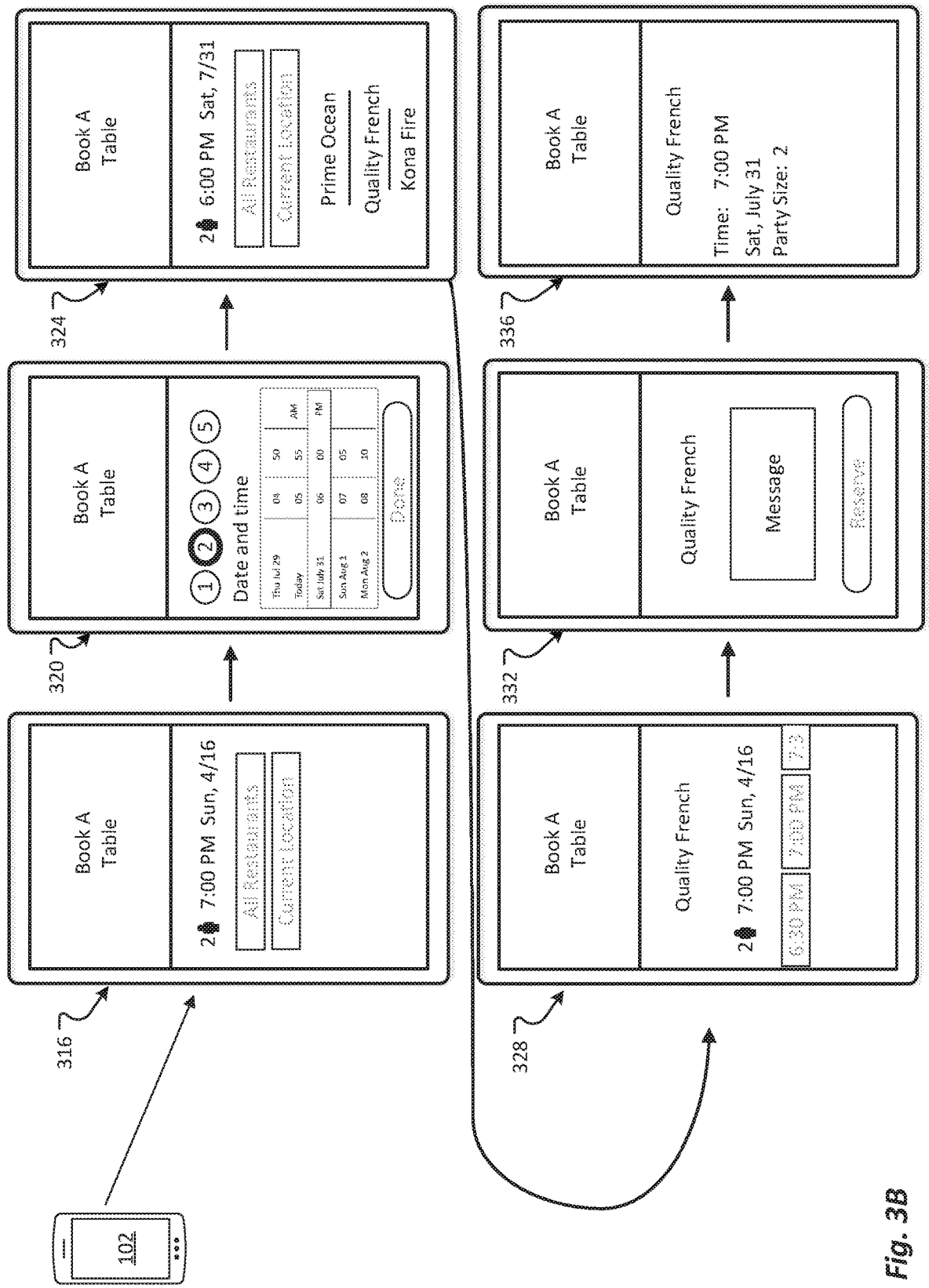
FIG. 3B depicts details of an app for booking a reservation at a restaurant utilizing a mobile device.

FIG. 3B provides a second example of a panel by panel user driven action of an app for booking a reservation at a restaurant utilizing the mobile device 102. The app may include a user interface 316 where a user may be prompted for a date, time, and number of persons for a reservation. Moreover, the user interface 316 may include an option to search for specific restaurant types, such as food-type, and search within a distance of a location. The app may include a user interface 320 where, upon selecting any one of the number of persons, date, and time entities of the user interface 316, a user may be prompted to change the number of persons, date, and time followed by a selection of the done button. The app may then generate a user interface 324, which provides a list of restaurants based on the inputs of number of persons, date, time, food-type, and location. Upon selecting a result, such as Quality French, the user interface 328 may provide additional details of the particular clicked card, or restaurant in this example. Upon confirming a selection, such as 7:00 PM, the app may generate a user interface 332 requesting additional details, if any, prior to reserving the reservation. Upon selecting the reservation button, the app may generate user interface 336 providing a summary of the reservation.

Figure 4:
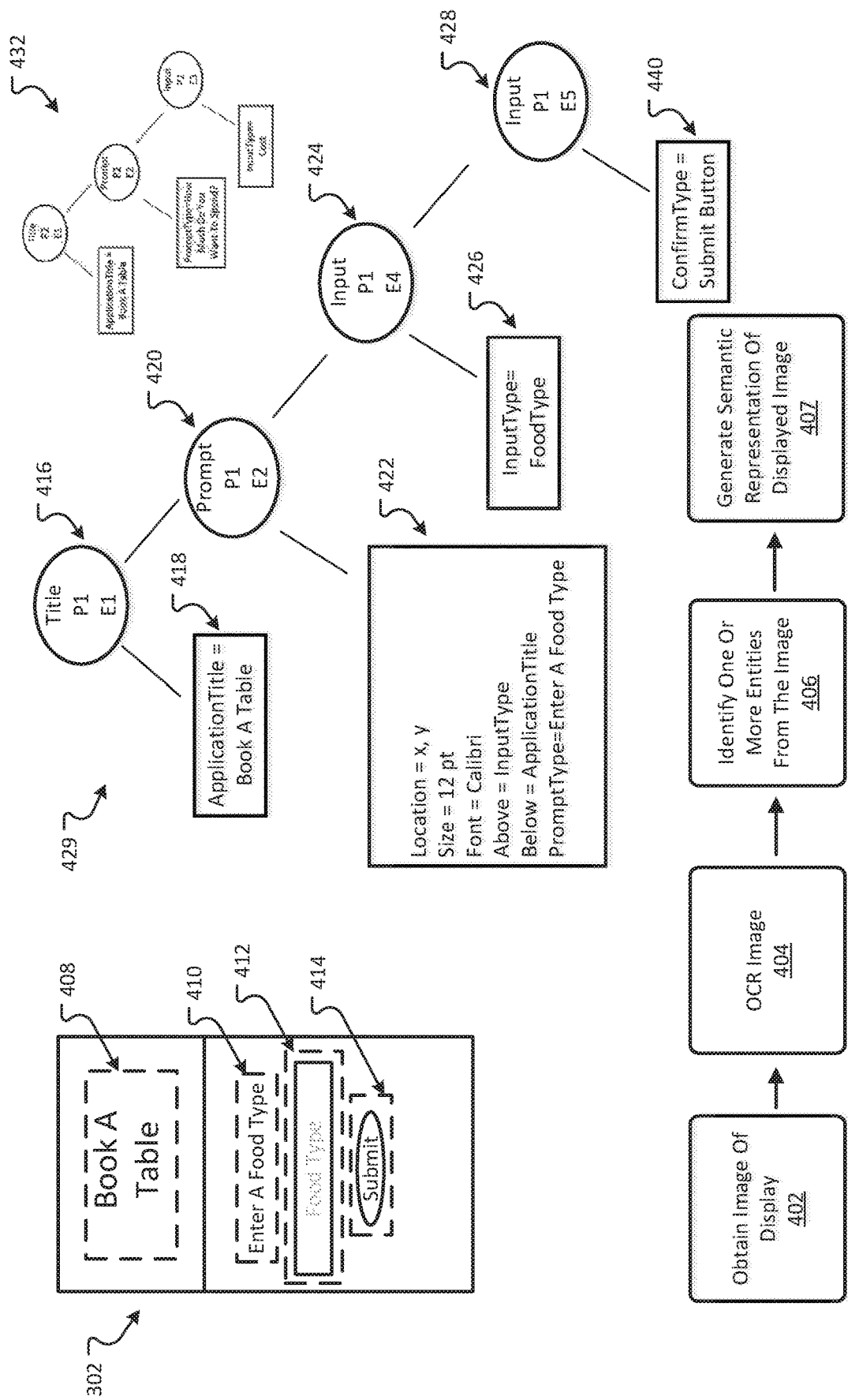
FIG. 4 depicts details directed to generating a semantic representation of an app in accordance with examples of the present disclosure.

Continuing with the example of FIG. 3A, an app may cause the user interface 302 to be displayed to a mobile device, such as the mobile device 102. As depicted in FIG. 4, an image of the display may be obtained at 402 for example, where the image is received as a screenshot or other image based representation of the user interface. In some examples, an OCR process may be performed on the acquired image such that text displayed at the user interface may be recognized and a position of the text may be identified. In some user interfaces, an entity displayed as part of the user interface may be determined based on characteristics of the entity. For example, text displayed near the top of user interface 302 may be determined to be a title element 408; such a hierarchical location amongst one or more elements in the user interface 302 may impart a meaning to such element. That is, the position and size of the text in the title element 408 in the user interface 302 may indicate that such text is a title or maintains some other importance among elements in the user interface. As another example, text element 410 displayed near an input element 412 may be classified as a prompt based on a location of the text element 410 with respect to the input element 412. The input element 412 may be identified as an input element based on size, location, characterization (e.g., rectangle), text color with respect to the color of other text or the color of other elements, or other characteristics of the entity. The submit button element 414 may be identified based on shape, location, and/or text label "submit." Based on the entities identified from the obtained image and the text obtained from the OCR process, a semantic representation of the user interface 302 may be generated at 407. As one example, the semantic representation may be generated as a structured graph 429 including nodes corresponding to one or more elements, element characteristics, and arranged in a hierarchical fashion. For example, the title element 408 may be included at the node 416, where the node may be associated with a page identifier, such as "P1," and an element identifier, such as "E1." Additional classification information 418 may be associated with the title element 408; that is, a structured tag including classification information 418 may be associated with the node 416, where the structured tag may indicate an entity type, such as "ApplicationTitle." As another example, a node 420 may be associated with the text element 410; a node 424 may be associated with an input element 412; and a node 428 may be associated with the submit button element 414. Classification information 422 may include a structured tag and may be associated with the node 420, where the classification information 422 provides additional information about the node 420 and thus the text element 410. Classification information 426 may include a structured tag that may be associated with the node 424, where the classification information 426 provides additional information about the node 424 and thus the input element 412. A structured tag 440 may be associated with the node 428, where the structured tag 440 provides additional information about the node 428 and thus the submit button element 414. Each of the structured tags including classification information 418, 422, 426, and/or 440 may be unique to the respective nodes and respective elements. In some examples, the classification information 418, 422, 426, and/or 440 corresponding to one or more structured tags may provide common information, such as location, size, and locational relationship information (e.g., closest to element E2). As additionally indicated in FIG. 4, a structured graph may be created for each of the user interfaces of an app; for example, the structured graph 432 may be created for the user interface 304. While the semantic representation is described in terms of a structured graph, it should be understood that the semantic representation may be described in other forms. For example, the semantic representation may be described in an XML format, XML document, or other representation allowing elements to be contextually described in a format.

Figure 5:
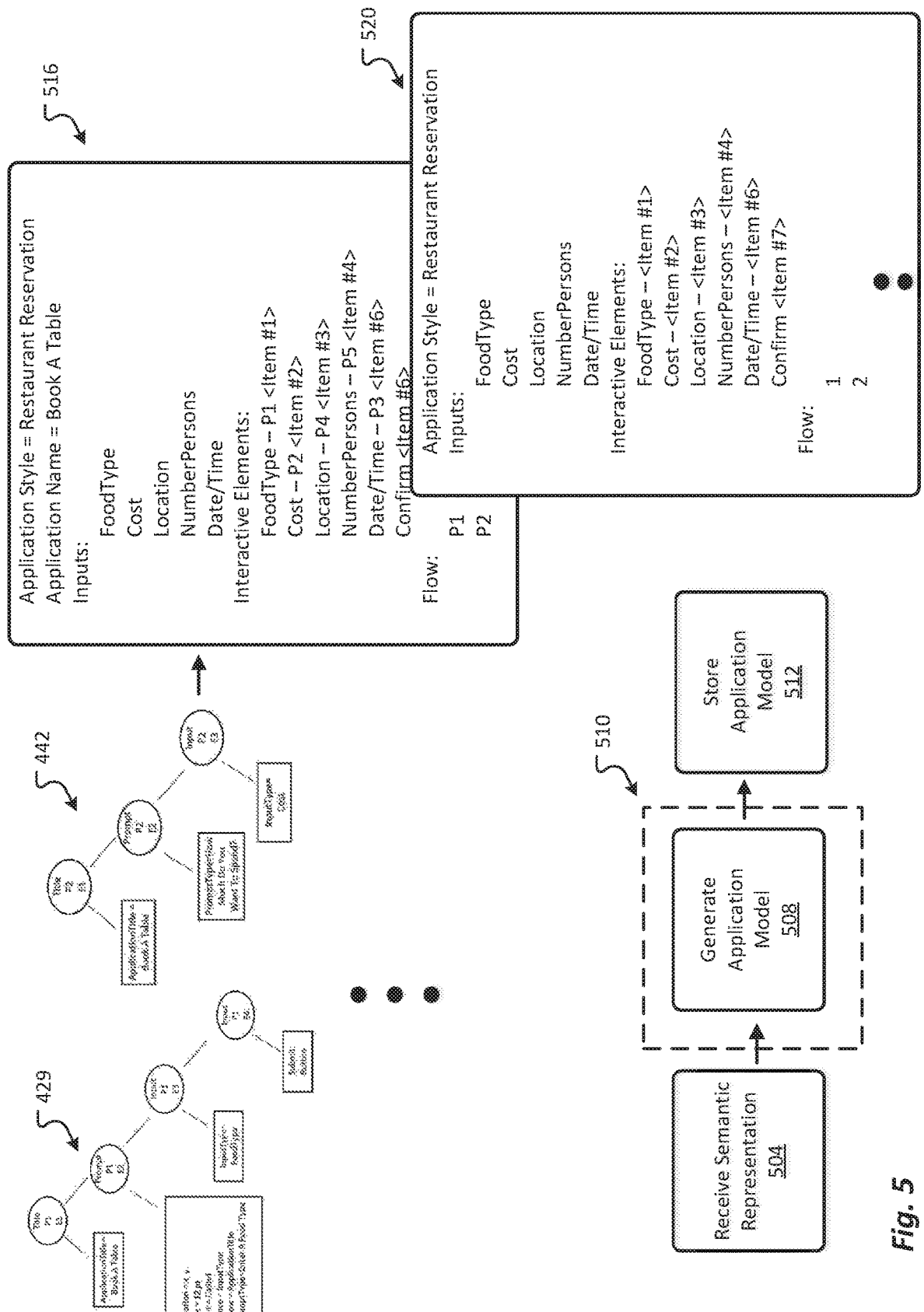
FIG. 5 depicts details directed to generating an application model for an app in accordance with examples of the present disclosure.

As depicted in FIG. 5, the semantic representation of the app may be received at 504 such that an application model may be generated at 508. For example, a semantic representation of the app may resemble the structured graph 429 or 432 for respective outputs to the display. Once the semantic representation of the app have been received, the application model may be generated at 508. One or more machine learning algorithms 510 may be implemented utilizing the semantic representation of the app as input. The classified and/or labeled semantic representation of the app may be utilized to train the machine learning model to determine the inputs needed by the app, when the inputs are needed by the app (e.g., which display), a flow of the app (e.g., a flow from one display to another display), and data dependencies (e.g., one piece of data and/or display may depend on another piece of data being present). Moreover, because the semantic representation may label elements as specific element types, the application model may determine an optimal method for interacting with such elements. For example, an application model 516, specific to the app, such as the "Book A Table" app may include inputs required or otherwise necessitated by the app. Moreover, the application model 516 may be categorized or otherwise included as a type or style of app. As an example, the "Book A table" app may be included as a "Restaurant Reservation." In some non-limiting aspects, one style of application model may inherit one or more features and/or functionalities from another style of application model. For example, the "Restaurant Reservation" style may inherit elements of date/time and location from a "Reservation" style. The application model generated at 508 may be stored at 512, for example, in a database of the storage location 216.

As a machine learning algorithm 510 may be utilized to generate an application model from the semantic representation of the app, the machine learning algorithm 510 may be trained utilizing data acquired from user/app interaction. In some examples, an application model may be generated by one or more services; in other examples, the application model may be trained with data obtained from the mobile device 102 and may be specific to the mobile device 102 and the user. The machine learning algorithm 510 may employ one or more machine learning processes for generating the machine learning model; however, other learning models and patterns may be employed and are herein contemplated.

In accordance with some examples of the present disclosure, a generic application model, not specific to any one app, may be generated based on a more specific application models. That is, the machine learning algorithm 510 may generate the application model 520 from the application model 516 and/or one or more semantic representations of the app or apps on which the semantic representations are based. Accordingly, the application model 520 may include inputs, elements, and flows derived from or otherwise learned from various apps that perform the function of reservation booking at a restaurant. For example, the interactive elements may be specified and may not be tied to a specific instance of the app. As another example, a generic flow from user interface to user interface may be displayed. In some aspects, if an application is encountered for which there is no application model, a generic application, such as the generic application model 520, may be utilized, where the generic application may adhere to a specific category or style of apps.

Figure 6:
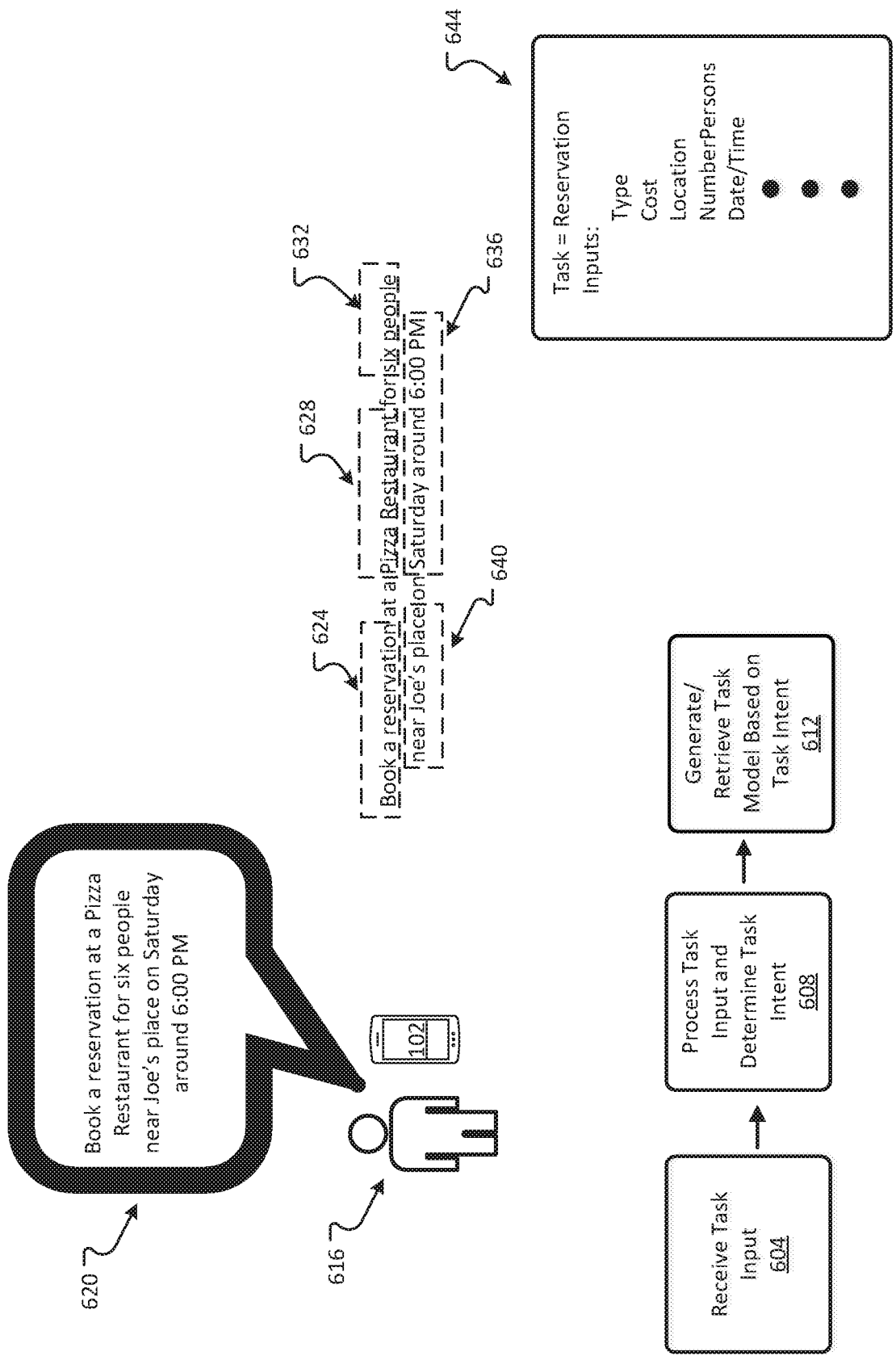
FIG. 6 depicts details directed to generating a task model in accordance with examples of the present disclosure.

As depicted in FIG. 6, input 620 from a user 616 may be provided to the mobile device 102. The input 620 may be in the form of speech, text, or speech converted to text. In examples, the input 620 may be received as a task input 604, where the input 620 may be processed at 608 to determine a task intent such that an appropriate task model may be generated and/or retrieved. Intent determination may be the automated association of text to a specific purpose or goal. For example, the user 616 may provide the input "Book a reservation at a Pizza Restaurant for six people near Joe's place on Saturday around 6:00 PM" to the mobile device 102. The intent may be determined to be "Reservation" or "Schedule a reservation." In some examples, the task intent may be more specific, such as "Schedule a reservation at a restaurant." A mobile device 102 assistant, such as Cortana, Ski, Alexa, or otherwise, may receive the content and determine a task intent, passing the task intent to the automation agent 106. In other examples, the automation agent 106 may receive the input 620 and utilize one or more natural language processing techniques to identify the task intent. An appropriate task model may then be generated if one does not already exist, or otherwise be retrieved from a storage location, such as the database 226. The automation agent 106 may process the input 620 to not only identify the task intent, but additional details or context associated with the task intent. For example, one or more natural language processing techniques may be utilized to identify the task intent 624, a type of food 628, a reservation size 632, a location 640, and/or a data/time 636. Accordingly, a task model 644 may be generated or otherwise obtained based on such information. That is, the task model 644 may include contextual information for the task intent.

In some examples, a generic task model may be retrieved from a storage location and populated with contextual information extracted from the input, such as input 620. Thus, the task intent may identify a task model corresponding to booking a reservation, and populate the task model with information extracted or otherwise determined from the input 620. Thus, a task model may be utilized to identify additional information, such as specifics to the contextual information associated with the task intent.

In some examples, the task model 644 may determine that additional information is needed for the task. In some instances, the additional information may be acquired from applications already present on the mobile device and/or from previous user preferences. In some examples, the task model 644 may indicate that the information is missing and will need to be acquired; accordingly, rather than request the missing information from the user as it is determined that the information is needed, the automation agent 106 may condense all instances of missing information such that a consolidated screen is provided to the user such that the user can enter all missing information at a single instance in time and/or at a single user interface.

Figure 7:
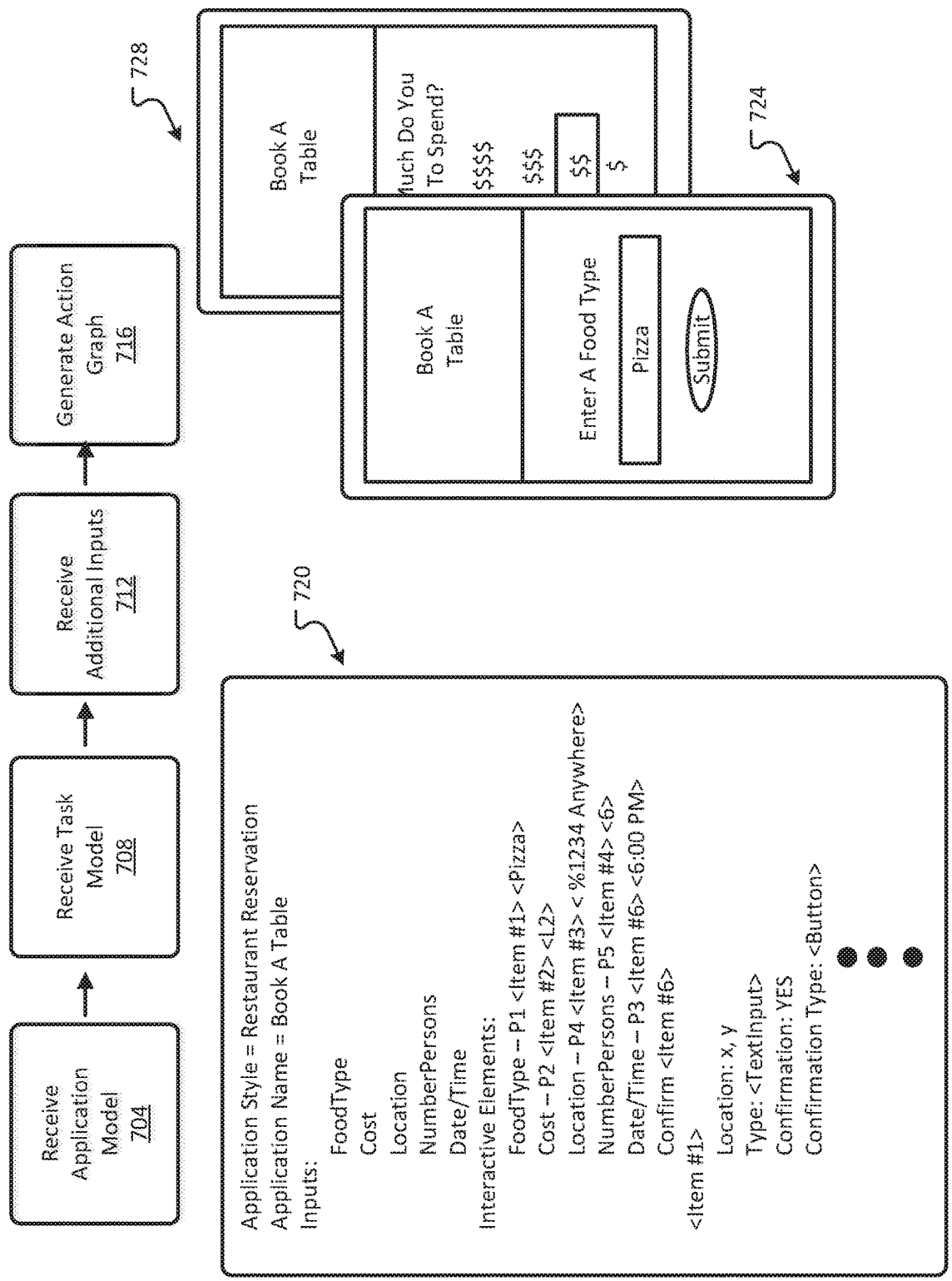
FIG. 7 depicts details directed to generating an action graph in accordance with examples of the present disclosure.

As depicted in FIG. 7, an application graph 720 may be generated from the task model and the application model. The application graph 720 may utilize the application model, the task model, and additional information to generate a representation, such as 720, for interacting with the specific app. As one example, the application graph may identify specific inputs that are or will be needed, identify which elements are interactive elements, and include information specific to each element for interacting with the user interface. In some examples, the application graph 720 may determine that additional information that is needed may be acquired from applications already present on the mobile device and/or from previous user preferences. In some examples, the application graph 720 may generate a user interface to present to the user such that a user interface consolidating all missing information requests is provided to the user such that the user can enter all missing information at a single instance in time and/or at a single user interface.

The application graph may be sequential in that a natural flow of the application graph matches the flow of the app; in some examples, the application graph may be a repository of input information, flow information, and element location information specific to a received task. That is, the application graph goes beyond a script in that the information included in the action graph is derived for each instance of automation. A task is received, for example, from the input 620, a new action graph is generated based on the information in the input, the application mode, the task model, and any additional information obtained by the automation agent 106. Thus, the user interface 724 may depict a first interaction of the automation agent 106 with the app; the user interface 728 may depict the second interaction of the automation agent 106 with the app.

Figure 8A:
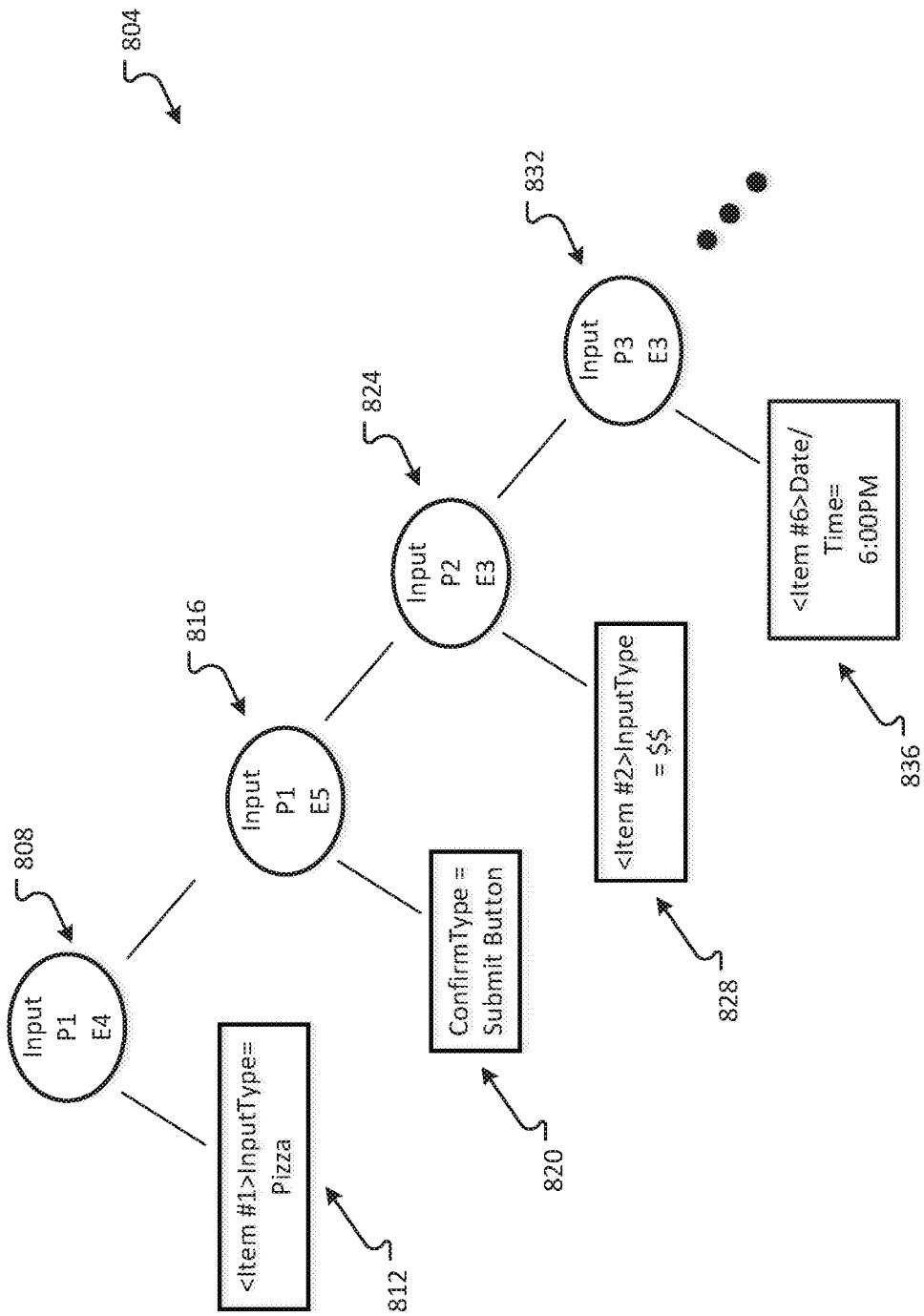
FIG. 8A depicts an example of an action graph in accordance with examples of the present disclosure.

FIG. 8A depicts a second example of an action graph 804 in accordance with examples of the present disclosure. More specifically, the action graph 804 may include a plurality of nodes representing flow from one element to another element. A first node 808 may be associated with a first input element 412 for example. Task specific information 812 may be associated with the node 808 such that when element E4 on page P1 is encountered, information associated with <Item #1>, such as Pizza, is entered into the input element. As further depicted, task specific information 820 may be associated with the node 816 such that when element E5 on page P1 is encountered, the confirmation button is depressed. Similarly, task specific information 828 may be associated with the node 824 such that when element E3 on page P2 is encountered, information associated with <Item #2>, such as $$, is selected. As another example, task specific information 836 may be associated with the node 832 such that when element E3 on page P3 is encountered, information associated with <Item #6>, such as Saturday, July 06, 6:00 PM, is selected. In some examples, the task specific information, such as 812, may include element identification information (location, color, style, etc). In some aspects, an optical character recognition process may occur prior to the interaction of the automation agent 106 with the app. For example, a semantical representation, as previously described, may be generated to confirm that the text elements, input elements, and user interface matches the application graph.

Figure 8B:
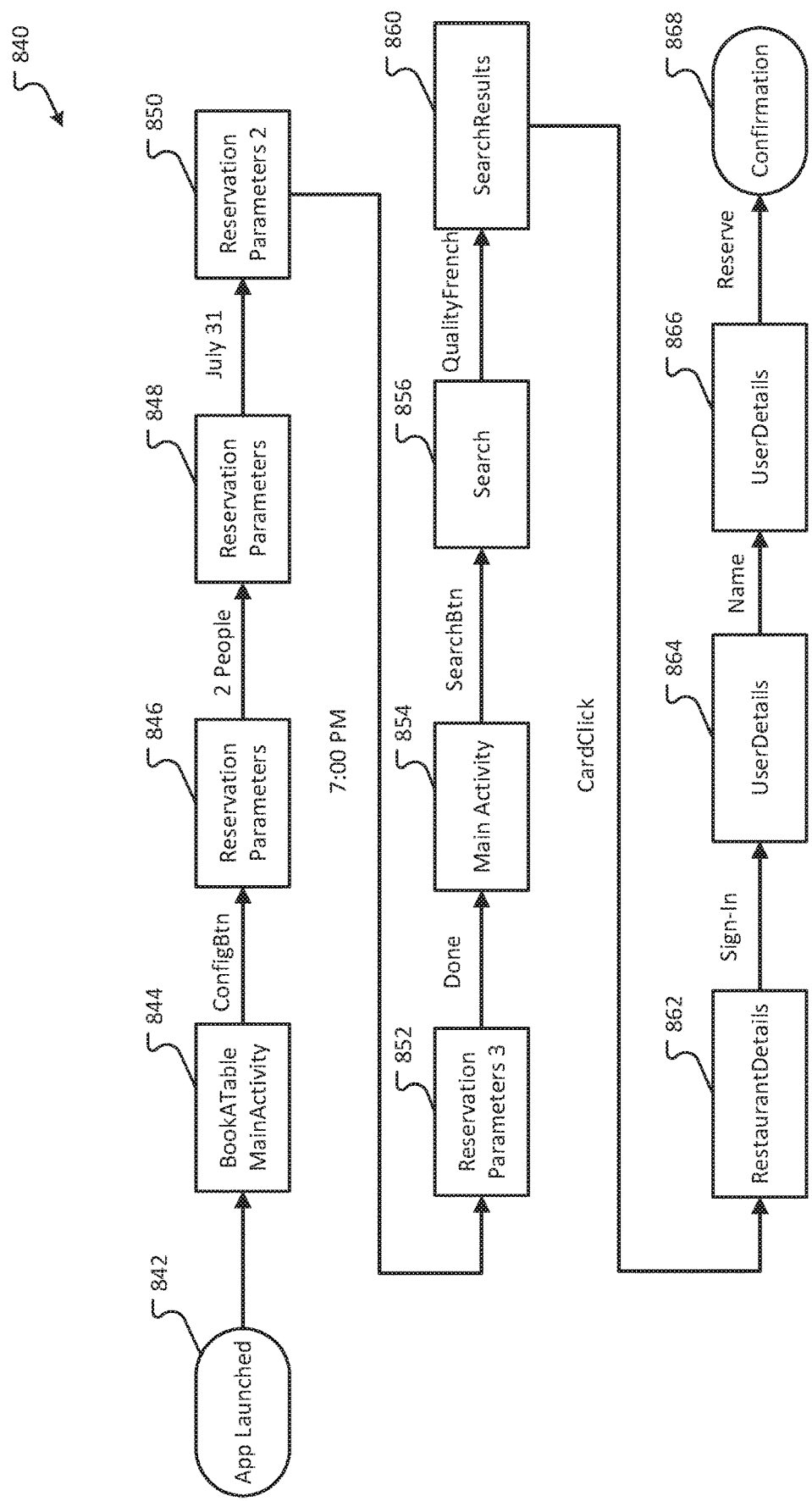
FIG. 8B depicts an example flow diagram depicting steps for booking a restaurant in accordance with examples of the present disclosure.

FIG. 8B depicts an example flow diagram 840 of a restaurant app corresponding to FIG. 3B. The app may be launched at 842, where a main screen or activity is presented at 844. Upon a selection of a configuration option, one or more reservation parameters may be requested of the user at 846. At 848, the reservation parameters of 2 persons may be received; at 850, the reservation parameters of July 31 may be received; and at 852, the reservation parameters of 7:00 PM may be received. The app may flow back to the main activity at 854, where a user may select a search button received at 856 such that one or more searches are performed and the results, based upon the inputs, are displayed at 860. Upon clicking on at least one of the search results, the details of the restaurant are provided at 862. In some instances, a user may need to sign-in; therefore, user details may be received at 864 and additional user details may be requested at 866. A reservation confirmation may be received at 868.

Figure 8C:
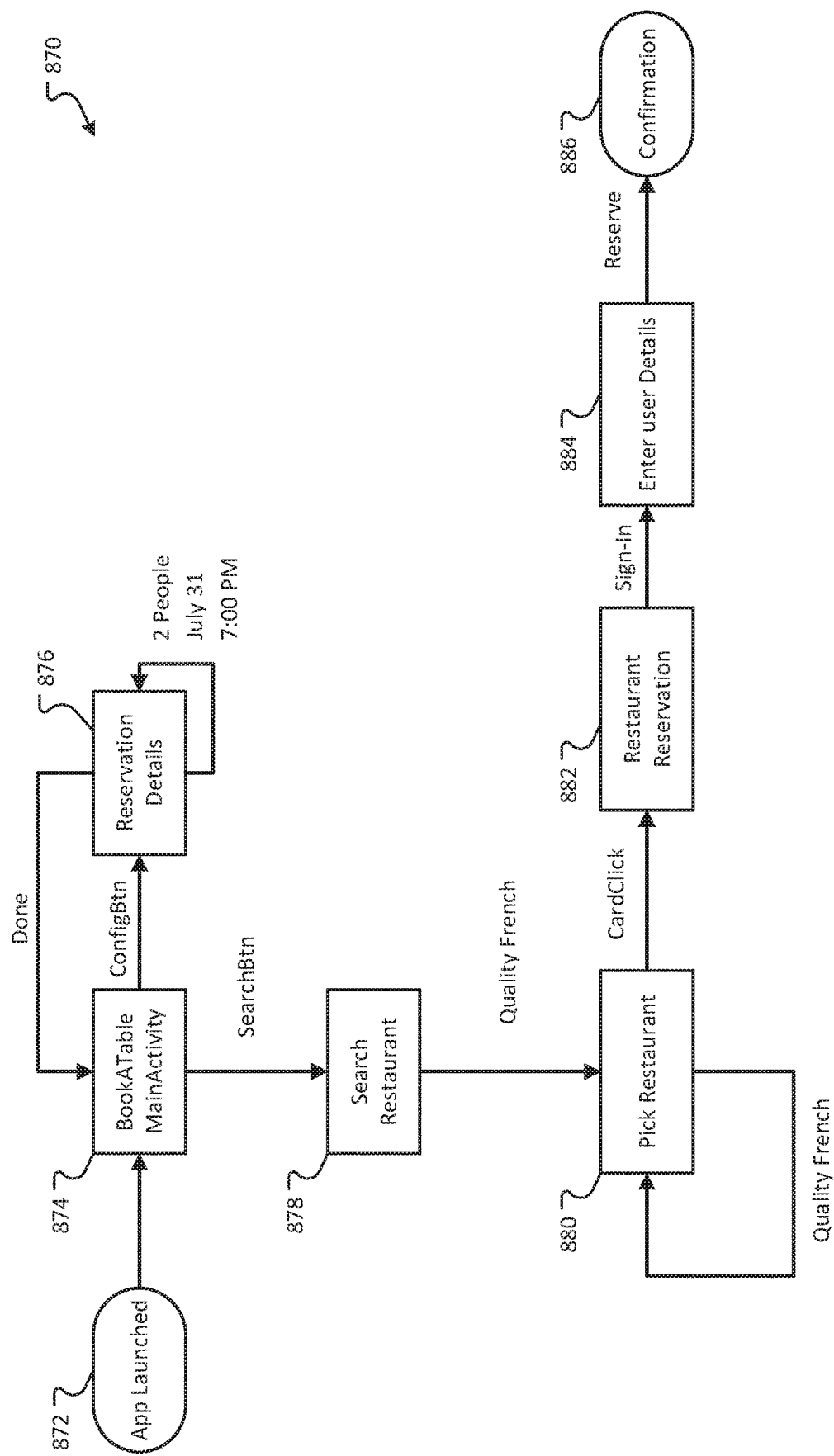
FIG. 8C depicts a second example of an action graph in accordance with examples of the present disclosure.

FIG. 8C depicts another example of an application graph 870 in accordance with examples of the present disclosure. More specifically, the action graph may be a set of connected states that encapsulates individual pieces of functionality in the application or app of FIG. 3B. Accordingly, the application graph 870 may start at 872 where the app may be launched. At 874, the main activity, such as the main screen may be encountered. The reservation details may be input into the user interface at 876, where a user can search at 878 for a specific restaurant. The results returned may allow a user to pick one of the restaurants at 880 to provide additional details at 882, such that a user may sign-in at 884 if needed and reserve the reservation. A confirmation may be provided at 886.

Figure 9:
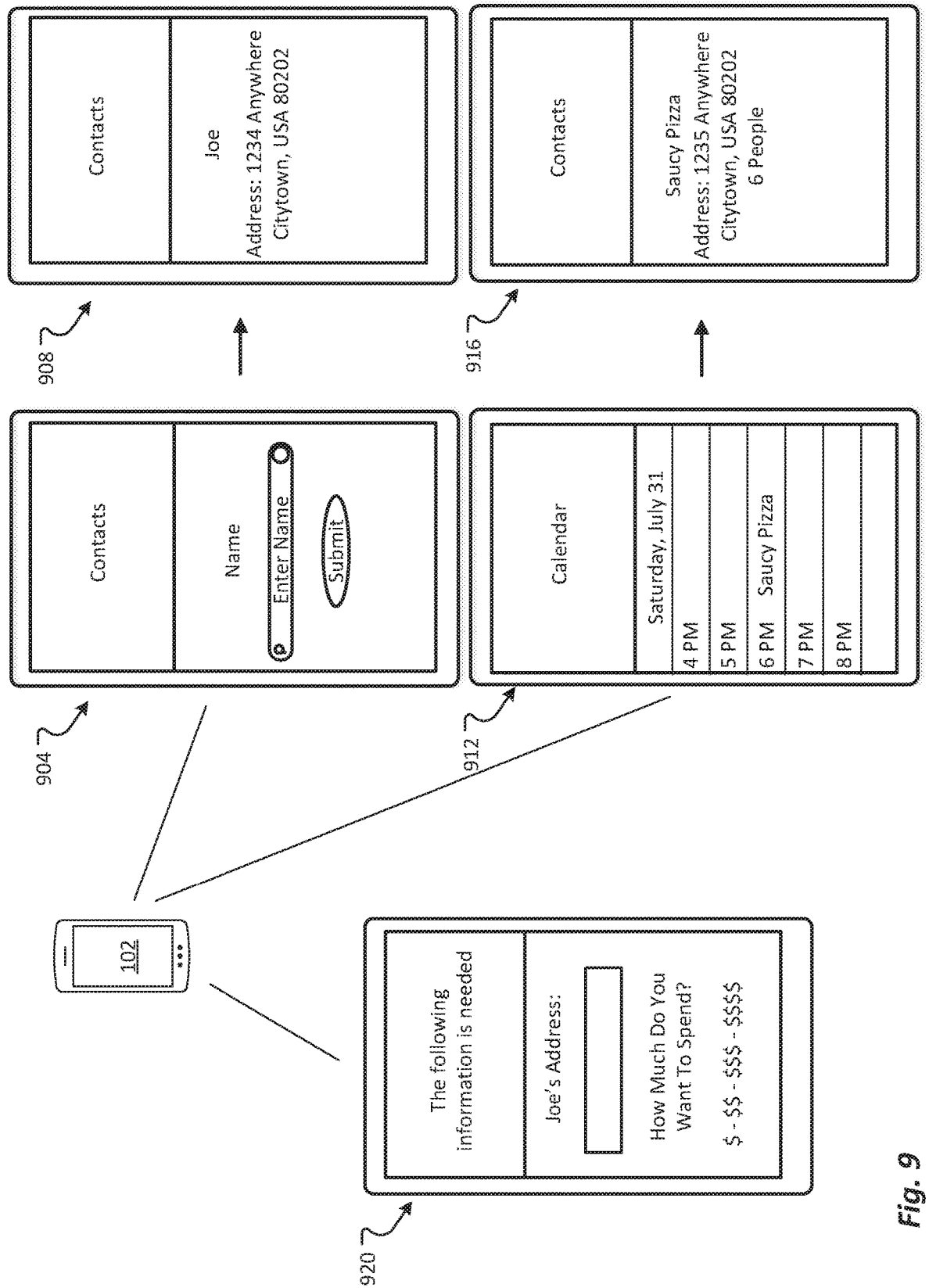
FIG. 9 depicts an example of interacting with multiple apps in accordance with examples of the present disclosure.

In some aspects, the automation agent 106 may determine that information provided in the input 620 for example, is not specific enough or otherwise does not provide a necessary input as determined by the application model. That is, a location 640, such as "near Joe's place" does not identify a specific location associated with a restaurant or area; instead, the location is associated with or otherwise identified through association with another entity, in this case Joe. Accordingly, the automation agent may determine a task intent, such as identify location, a task model which may include Joe, and retrieve an application model for interacting with a contact list, as depicted in FIG. 9. Accordingly, an action graph may be generated for providing input to and interacting with a user interface displaying the contact list based on the task model and the application model. For example, the user interface 904 may be displayed such that the application graph places the name Joe, into the search box, and mimics the selection of the submit button. Accordingly, the automation agent 106 may obtain a specific location, such as Joe's address, from interacting with the user interface 908. As another example, information needed may be presented to the user at a single instances, such as at the user interface 920. For example, the address of Joe's place and an amount the user wishes to spend may be requested at the same time; thus the automation agent 106 for example, may determine that information is missing, assembly an input user interface, such as 920, and present the user interface to the user. In some instances, some of the information may be determined based on previous user preferences. In some instances, the automation agent may automate an interaction with an additional app following the interaction of a primary app, such as the "Book a Reservation" app. As depicted in FIG. 9, the automation agent 106 may interact with a calendar application displaying the user interface 912 and place a reminder in the calendar as depicted in the user interfaces 912 and 916.

Figure 10:
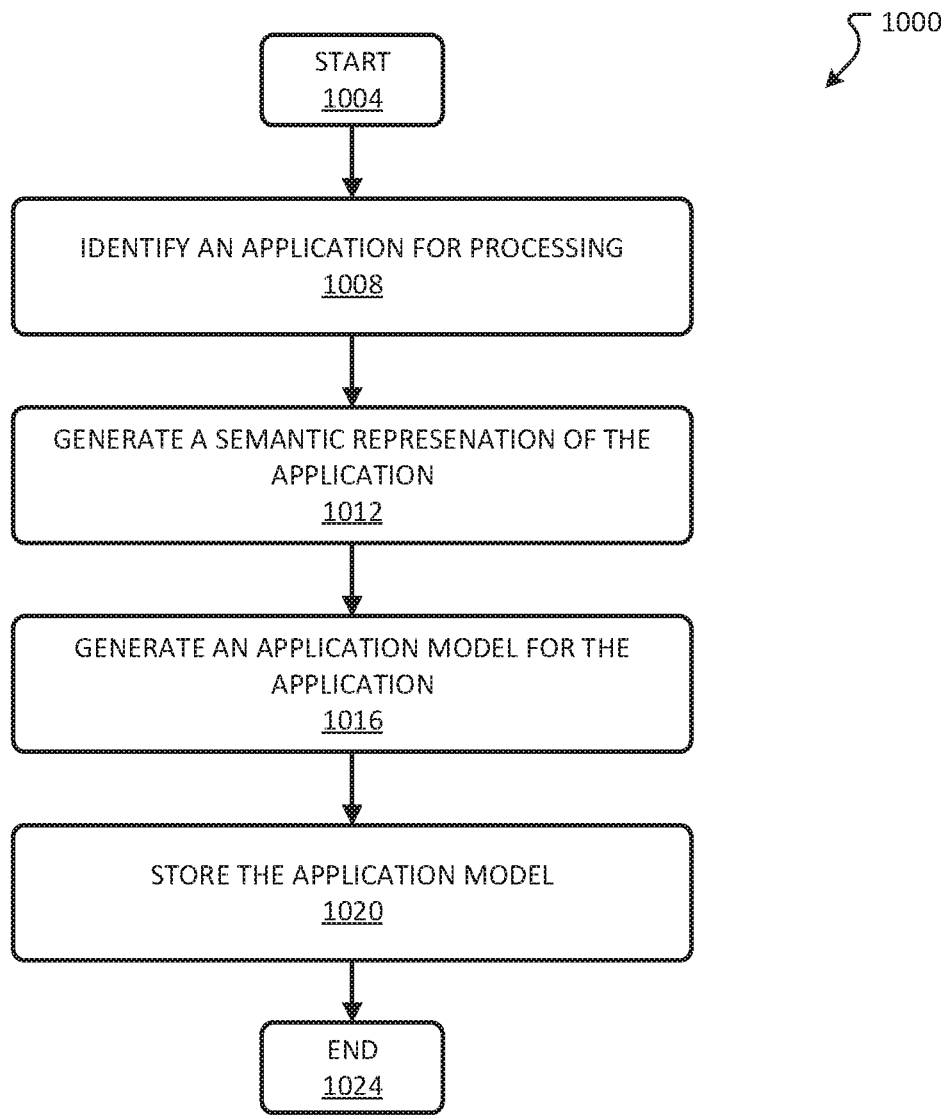
FIG. 10 depicts details of a method for generating an application model in accordance with examples of the present disclosure.

FIG. 10 depicts details of a method 1000 for generating an application model in accordance with examples of the present disclosure. A general order for the steps of the method 1000 is shown in FIG. 10. Generally, the method 1000 starts at 1004 and ends at 1024. The method 1000 may include more or fewer steps or may arrange the order of the steps differently than those shown in FIG. 10. The method 1000 can be executed as a set of computer-executable instructions executed by a computer system and encoded or stored on a computer readable medium. Further, the method 1000 can be performed by gates or circuits associated with a processor, Application Specific Integrated Circuit (ASIC), a field programmable gate array (FPGA), a system on chip (SOC), or other hardware device. Hereinafter, the method 1000 shall be explained with reference to the systems, components, modules, software, data structures, user interfaces, etc. described in conjunction with FIGS. 1-9.

The method starts at 1004, where flow may proceed to 1008 to identify an application for processing. The application for processing may be identified based on an application lookup, where a user may download, install, or initiate interaction with an application that has not already been processed and is not, for example, associated with an application in the application model database at the storage location 216 for example. In some examples, the identification of the application may be performed at a location different from the mobile device 102. That is, the identification of the application may occur at a server that is communicatively coupled to the mobile device 102. In some examples, the identification of the application may be automated; in other examples, one or more users may submit a request to have the application processed and an application model generated. Flow may proceed to 1012, where a semantic representation of the application is generated.

As previously discussed, the semantic representation may be generated as a structured graph, such as the structured graph 429, and include nodes corresponding to one or more elements, element characteristics, and arranged in a hierarchical fashion. Pixel data, obtained from one or more images indicative of the user interface provided to the user, may be processed such that text elements, interactive elements, and other objects displayed in the user interface maybe detected and identified. Contextual information associated with each of the text elements, interactive elements, and/or other objects may be determined and/or identified; for example, location information of a text element, a type of interactive element (such as, but not limited to a text input field, a picker wheel, a date selector, a dropdown box, or otherwise), style, font, size, and locational relationship information (e.g., a location of one element or object with respect to another element or object) and/or other information may be determined and/or identified and associated with the text elements, interactive elements, and/or other objects. While an example of the semantic representation has been described in terms of a structured graph, it should be understood that the semantic representation may be described in other forms. For example, the semantic representation may be described in an XML, format, XML, document, or other representation allowing elements to be contextually described in a format. In some examples, one or more machine learning algorithms may be utilized to identify one or more of the elements and/or objects. The machine learning algorithm may employ one or more machine learning processes for generating the semantic representation of the application.

Flow may then proceed to 1016, where based on the semantic representation of the application, an application model may be generated. That is, an application model for interacting with an application may be generated. For example, the application model based on the semantic representation of the application may include information describing a general flow of the application, inputs needed for the application, outputs from the application, and location and placement information for elements and objects, either interactive, static, or otherwise. The application model may include a representation of each user interface provided to a user as encountered utilizing the application; one or more pieces of information that may be required by the application and provided by the user; a process or flow of the application for accomplishing one or more tasks; and/or may utilize an existing application, such as an application running on the mobile device 102 in order to obtain additional information prior to, or instead of, requesting such information from the user. The application model may specify that information requested from a specific user interface displayed to the user may be obtained from an application installed on or otherwise executing on the mobile device 102. The application model may indicate a contacts list, calendar application, other application available on the mobile device 102, or other source of information available on the mobile device 102. Accordingly, rather than requiring the user to enter the address information needed by the application, the automation agent may access the information from the application or an information repository. Alternatively, or in addition, the application model, together with the automation agent, may determine one or more pieces of information that may be required by the application model and may generate a user interface to request the multiple pieces of information from the user at the same time. Moreover, the application model may determine an optimal method for interacting with one or more elements or objects. For example, input may need to be provided to a first input element before input can be provided to the second input element. As another example, selecting one element on the user interface may filter subsequently displayed elements.

One or more machine learning algorithm may be utilized to generate the application model from the semantic representation of the application. That is, the machine learning algorithm may be trained utilizing data acquired from or otherwise observed from user/application interaction. In some examples, an application model may be generated by one or more services at a location different from the mobile device. In other examples, the application model may be trained with data obtained from the mobile device 102 and may be specific to the mobile device 102 and the user. The machine learning algorithm may employ one or more machine learning processes for generating the machine learning model. However, other learning models and patterns may be employed and are herein contemplated.

In some examples, one or more generic application models may be generated based on semantic representations of one or more applications. For example, two applications, from the same or different vendors, may accomplish the same task, such as an application named "Flowers To Go" and an application named "Flowers.com." In accordance with some examples of the present disclosure, a generic application model, not specific to any one app, may be generated based the "Flowers To Go" application and/or the "Flowers.com" application. Thus, elements common to both applications may be identified from the semantic representation of the applications; such common elements may be included in a generic application for ordering flowers. As another example, the application model may include inputs, elements, and flows derived from or otherwise learned from various apps that perform a task, such as the task of reservation booking at a restaurant. In some aspects, the application model may adhere to or otherwise be classified as a specific category or style of application; such information may be associated with the application.

Once the application model has been generated, flow may proceed to 1020 where the application model is stored. The application model may be stored at the storage location 216 for retrieval.

Figure 11:
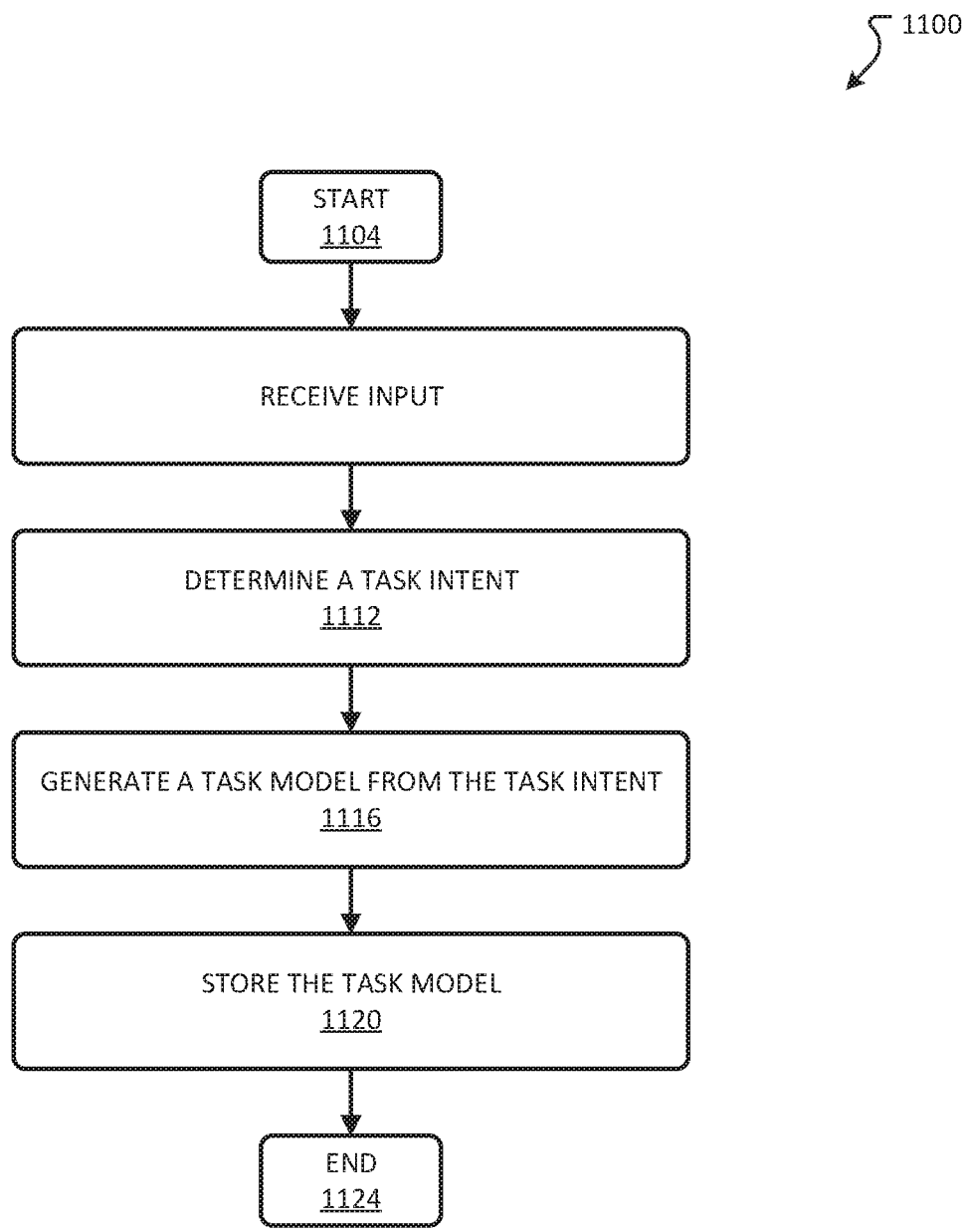
FIG. 11 depicts details of a method for generating a task model in accordance with examples of the present disclosure.

FIG. 11 depicts details of a method 1100 for generating a task model from received input in accordance with examples of the present disclosure. A general order for the steps of the method 1100 is shown in FIG. 11. Generally, the method 1100 starts at 1104 and ends at 1124. The method 1100 may include more or fewer steps or may arrange the order of the steps differently than those shown in FIG. 11. The method 1100 can be executed as a set of computer-executable instructions executed by a computer system and encoded or stored on a computer readable medium. Further, the method 1100 can be performed by gates or circuits associated with a processor, Application Specific Integrated Circuit (ASIC), a field programmable gate array (FPGA), a system on chip (SOC), or other hardware device. Hereinafter, the method 1100 shall be explained with reference to the systems, components, modules, software, data structures, user interfaces, etc. described in conjunction with FIGS. 1-10.

The method starts at 1104, where flow may proceed to 1108 where an input may be received. The input may be received at the mobile device and may include information indicating that a task is to be performed. In some examples, the input may be received directly at the mobile device 102 as speech for instance; an application, such as the automation agent 106 may process the received speech into text and utilize one or more natural language processing algorithms parse and understand the input. In some examples, an assistant, such as Cortana, already running on the mobile device may processing the input, such as speech, and provide processed input to the automation agent 106. In some examples, the input may be a location, a time, a rate of change of some parameter, or some other characteristic associated with a user and/or mobile device.

Method 1100 may then proceed to 1112, where a task intent may be identified from the received input. As one example, based on a user supplied input of "Send flowers to mom for her birthday," a task intent, "send flowers," may be identified. As another example, a task intent may be generated from an appointment in a user's calendar and may be coupled to or otherwise associated with a location, such as a conference room location or entity. Accordingly, based on the appointment and the location of the mobile device 102 in relation to a location associated with the appointment, one or more task intents, such as "attend meeting", may be identified. Accordingly, the method 1100 may proceed to 1116, where a task model specific to the task intent may be generated. The task model may include one or more subtasks. For example, the task model may break a task intent of "send flowers" to the subtask of (1) determine who the flowers are to be delivered to; (2) determine an address or location to send the flowers to; (3) determine when the flowers are to be delivered; (4) determine what kind of flowers to send; (5) determine how much to spend on the flowers; (6) determine a vendor app to use to purchase the flowers; and (7) determine if there are to be any additions to the flower order, such as a card, vase, etc. For each subtask, a task intent and/or a task model maybe determined. For example, a model based on the task intent of "determine who the flowers are to be delivered to." In other instances, the task model may include a subtask of "determine who the flowers are to be delivered to" and only create a task model if information necessary to satisfy the subtask is not available. In the "Send flowers to mom for her birthday" example, information for the subtask of "determine who the flowers are to be delivered to" may be included in the received input at 1108; the input may be parsed such that task information can be extracted or otherwise obtained from the received input. Once the task model has been generated, the task model may be stored at 1120 and method 1100 may end at 1124. In some instances, information received as input at 1108 may be stored in a storage location 236 at step 1108. For example, contextual information or other information obtained from the input may be extracted, obtained, or otherwise generated and stored. As one non-limiting example, "mom" and "birthday" may be stored at 236 and utilized to complete an action graph. In some examples, where a task model may already exist for "send flowers," the contextual information or other information obtained from the input may be stored without needing to create and store a model.

Figure 12:
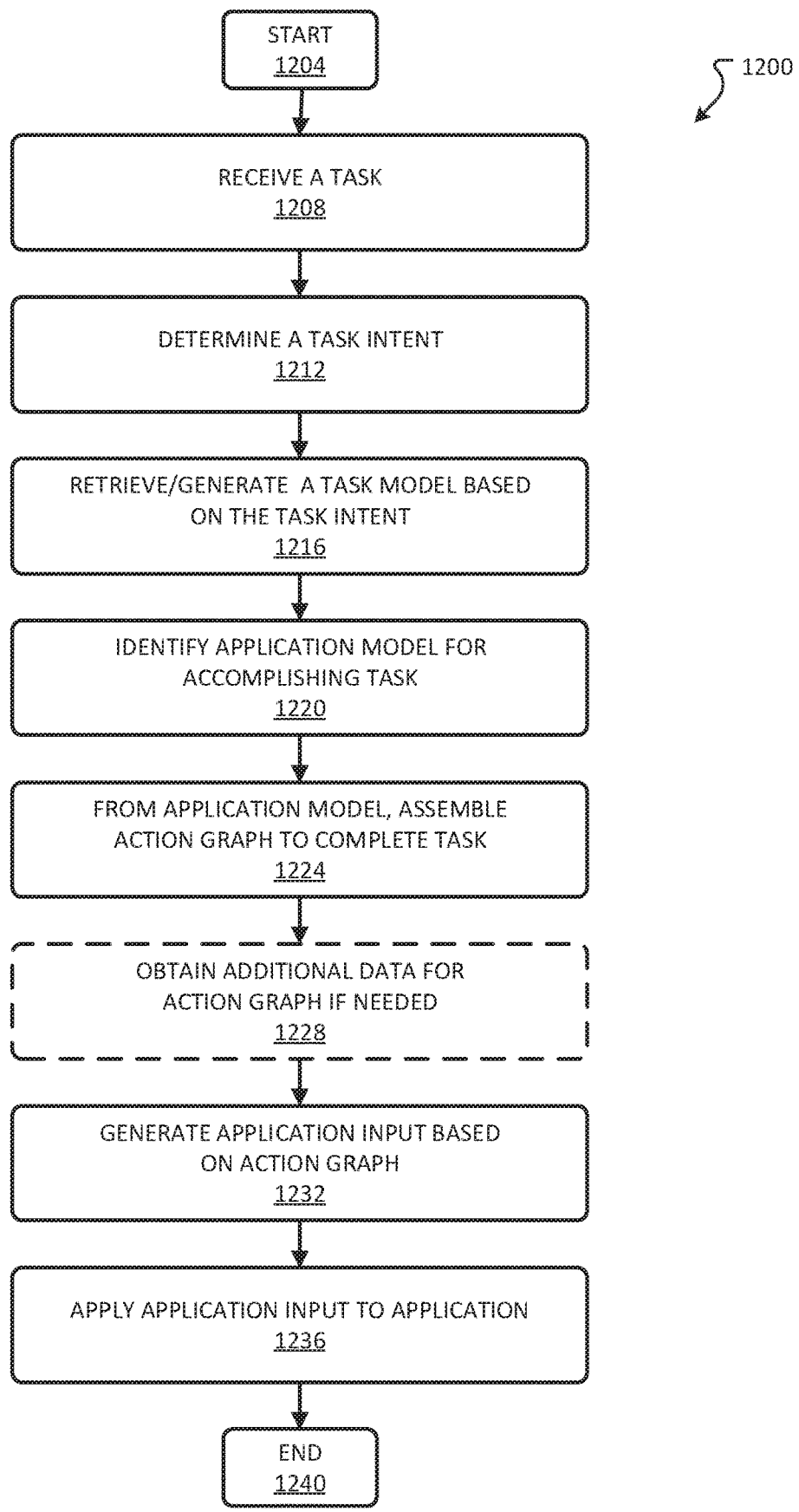
FIG. 12 depicts details of a method directed to automating one or more tasks in accordance with examples of the present disclosure.

FIG. 12 depicts details of a method 1200 for automating one or more tasks in accordance with examples of the present disclosure. A general order for the steps of the method 1200 is shown in FIG. 12. Generally, the method 1200 starts at 1204 and ends at 1240. The method 1200 may include more or fewer steps or may arrange the order of the steps differently than those shown in FIG. 12. The method 1200 can be executed as a set of computer-executable instructions executed by a computer system and encoded or stored on a computer readable medium. The method 1200 may be at least partially executed by an automation agent, such as the automation agent 106, residing on or otherwise executing at the mobile device 102. Further, the method 1200 can be performed by gates or circuits associated with a processor, Application Specific Integrated Circuit (ASIC), a field programmable gate array (FPGA), a system on chip (SOC), or other hardware device. Hereinafter, the method 1200 shall be explained with reference to the systems, components, modules, software, data structures, user interfaces, etc. described in conjunction with FIGS. 1-11.

Whereas methods 1000 and 1100 may be understood as methods for generating an application model and/or a task model, the method 1200 may be understood as automating a task based on the previously stored application model and/or task model. In some examples, where the application model and/or the task model have not been previously generated and/or stored, the method 1200 may generate or otherwise cause to be generated the respective model. In some examples, rather than generating the model specific to the application and/or task, a generic model may be utilized.

The method starts at 1204, where a task may be received. In some examples, the task may be received as input, where the input is processed such that a task is determined. In some examples, a task intent may be determined at 1212, where the task intent is determined either by the automation agent for example, or by another application executing on the mobile device 102. At 1216, a task model may be retrieved from a storage location, such as the storage location 228. In other examples, the task model may be generated at 1216, where the generation of the task model may be performed as described with respect to FIGS. 6 and 11. Based on the task intent, an application model may be identified at 1220. For example, a task intent of "sending flowers" may identify, retrieve, or otherwise obtain an application model that can accomplish the task of sending flowers. In some examples, the application model may be specific to an application, for example, the "Flowers To Go" application. In other examples, application model may be a generic application for interacting with a variety of applications capable of accomplishing the task of sending flowers. As another example, application model may be associated with a preferred application of the user, where the preferred application of the user is capable of accomplishing the task of sending flowers. Other non-limiting examples include an application model specific to scheduling a reservation, scheduling a reservation at a restaurant, and/or obtaining documents associated with attending a meeting.

Method 1200 may proceed to 1224, where an application graph may be assembled based on the identified application model and/or task intent as previously described with respect to FIG. 7 for example. The application graph may utilize the application model, the task model, and additional information to generate a representation, such as the application graph 720, for interacting with an application. As one example, the application graph may specify the inputs that are or will be needed, which elements are interactive elements, and specifics of each element for interaction on the user interface. The application graph may generate a user interface specific to the information that cannot be obtained from existing data sources and/or applications; for example, the application graph may generate a user interface requesting two pieces of information. The application graph may be sequential in that a natural flow of the application graph matches the flow of the application associated with the application model. In some examples, the application graph may be a repository of input information, flow information, and element location information specific to a received task. That is, the application graph generated at 1224 goes beyond a static script in that the information included in the action graph is derived for each instance of automation. That is, a new action graph may be generated at each instance of which a task is to be automated or otherwise accomplished. In instances where the application graph is not populated with or otherwise does not readily have access to data specified by the application model, the method 1200 may proceed to 1228 where additional data, or information is obtained. For example, the automation agent 106 may directly access a storage location 236 including a repository of data acquired over time for populating portions of the action graph. As another example, the automation agent may spawn another automated task for obtaining information, such as that which has been described previously with respect to FIG. 9.

Method 1200 may proceed to 1232, where application input for interacting with one or more user interfaces provided by the application are generated. In some examples, the application input may include initially launching the application. The application may provide the user interface to the display, or screen, of the mobile device and the automation agent may interact directly with the user interface. In some instances, the application may provide the user interface to a virtual display, or screen, of the mobile device; for example, a virtual display may be created by the automation agent, where the user interface of the application is directed to the virtual display. Accordingly, the application may interact with the user interface at the display of the mobile device or a virtual display created at the mobile device. Such interaction maybe performed at 1236. The method 1200 may then end at 1240.

Figure 13:
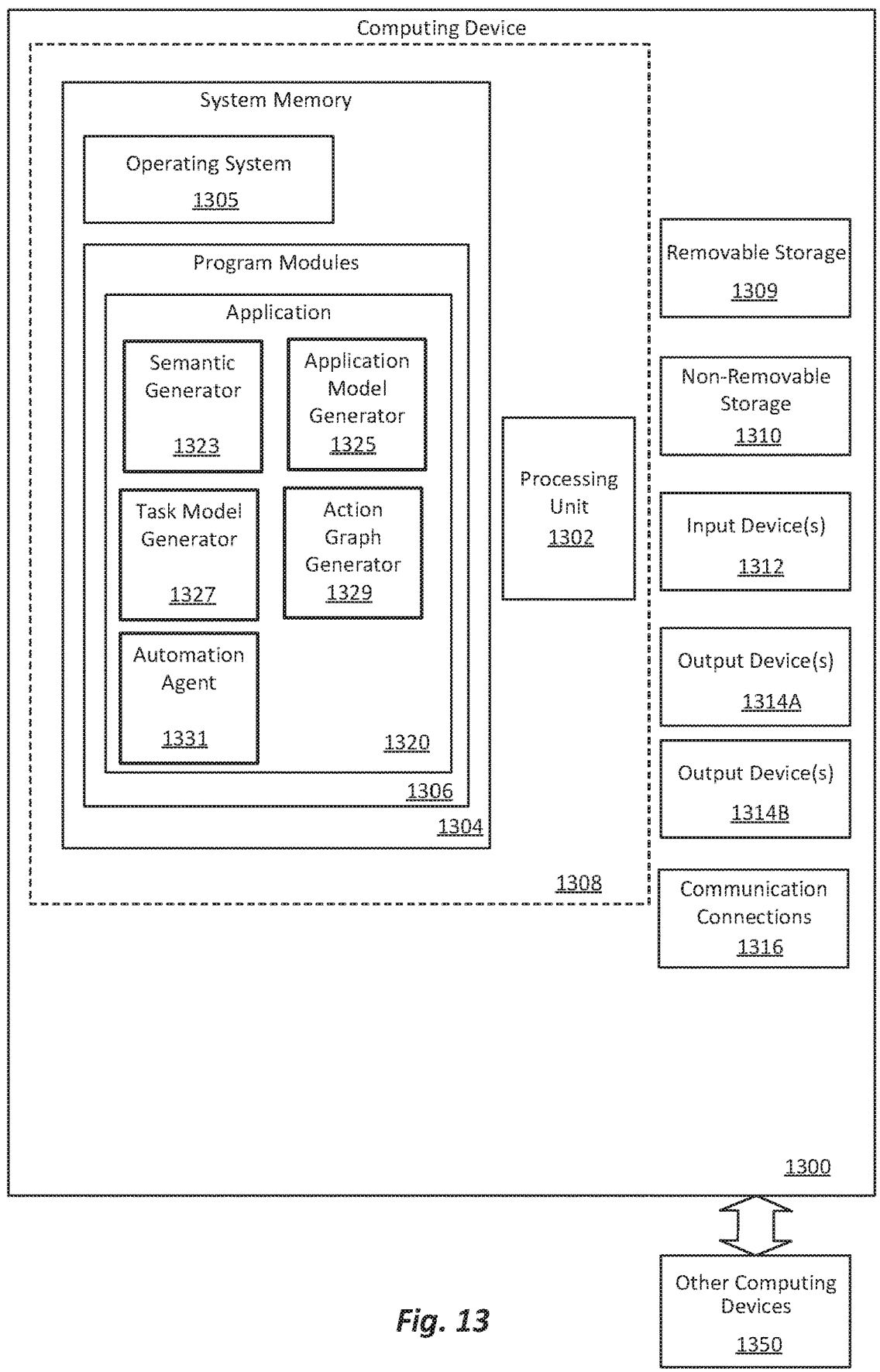
FIG. 13 is a block diagram illustrating physical components of a computing device with which aspects of the disclosure may be practiced.
Figure 14A:
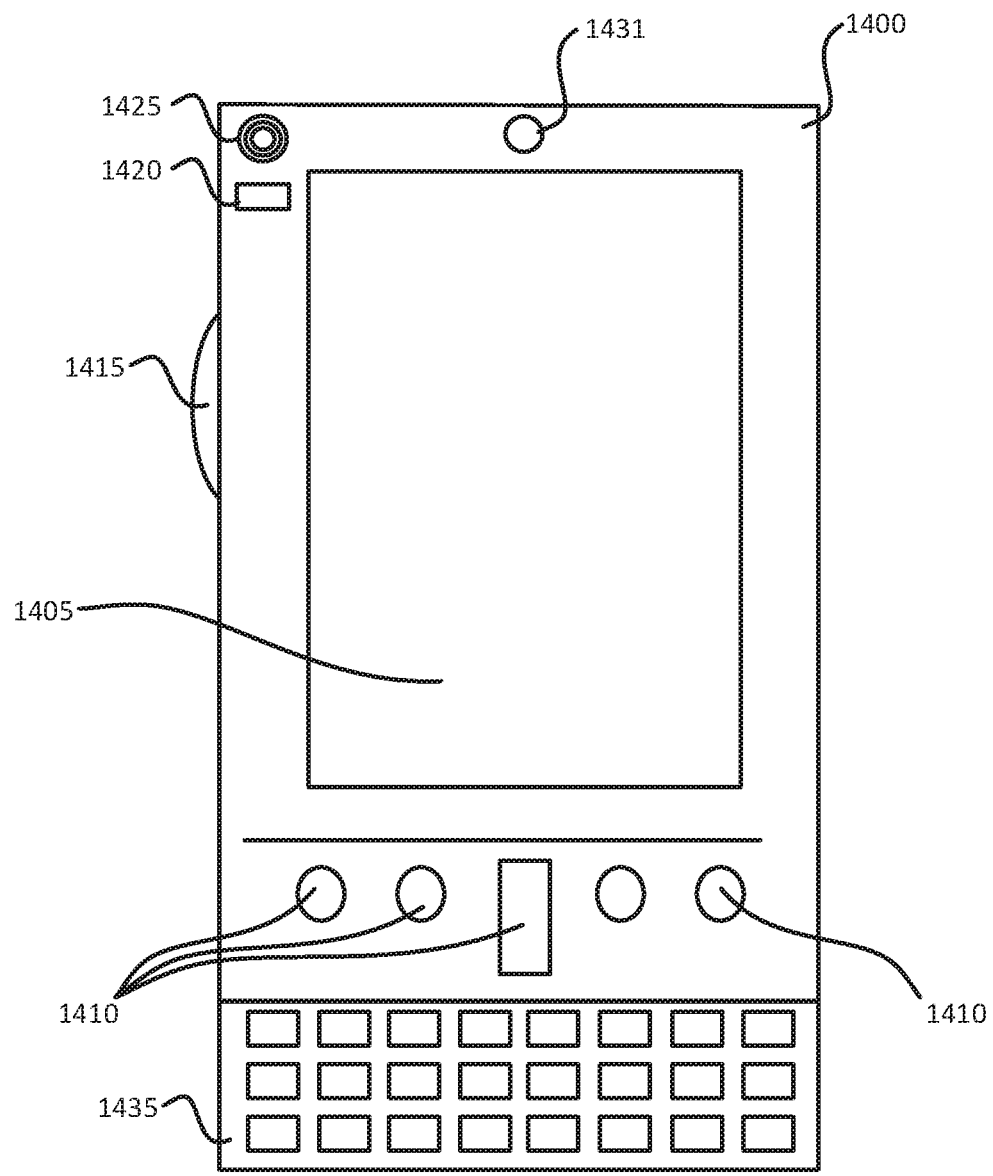
FIG. 14A illustrates a first example of a computing device with which aspects of the disclosure may be practiced.
Figure 14B:
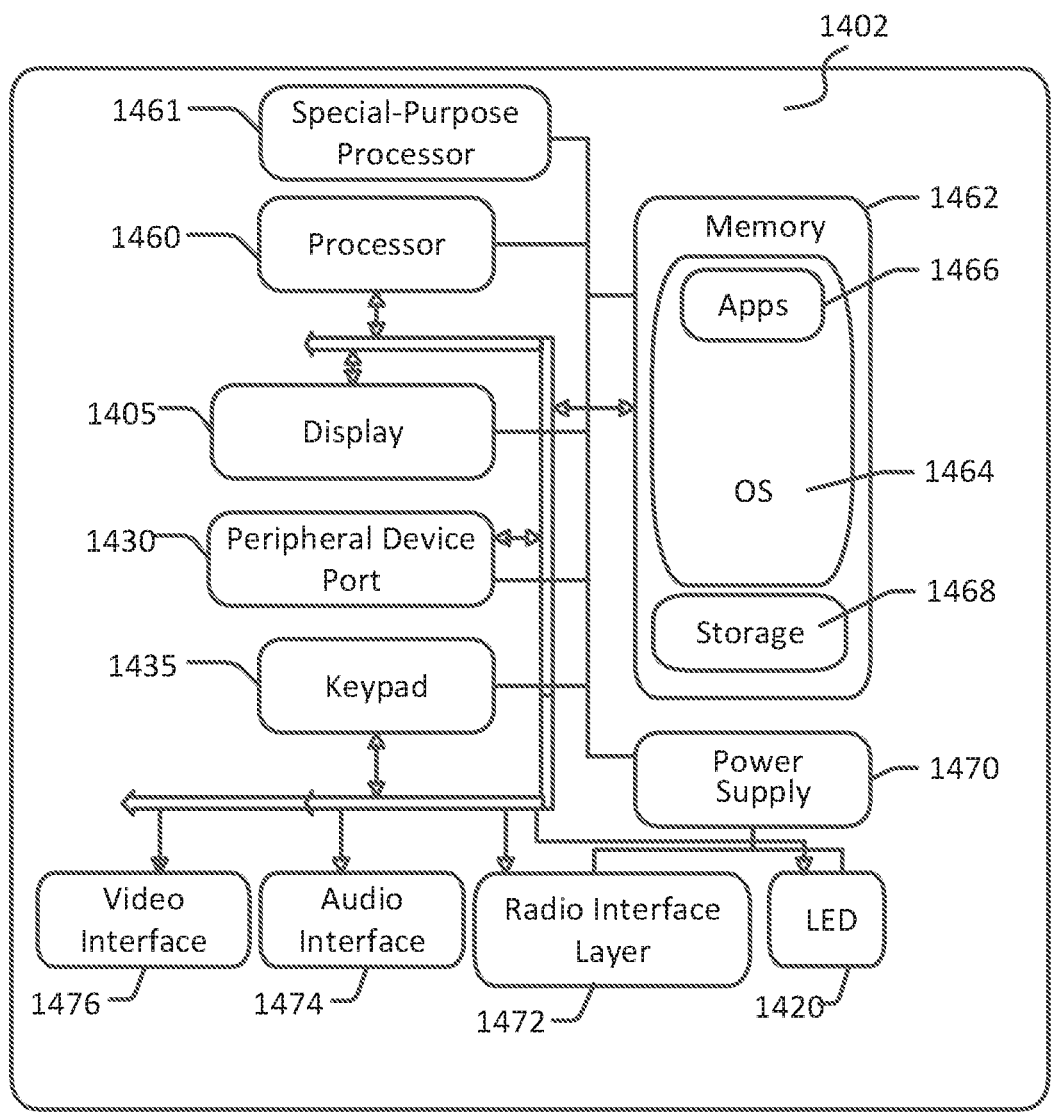
FIG. 14B illustrates a second example of a computing device with which aspects of the disclosure may be practiced.
Figure 15:
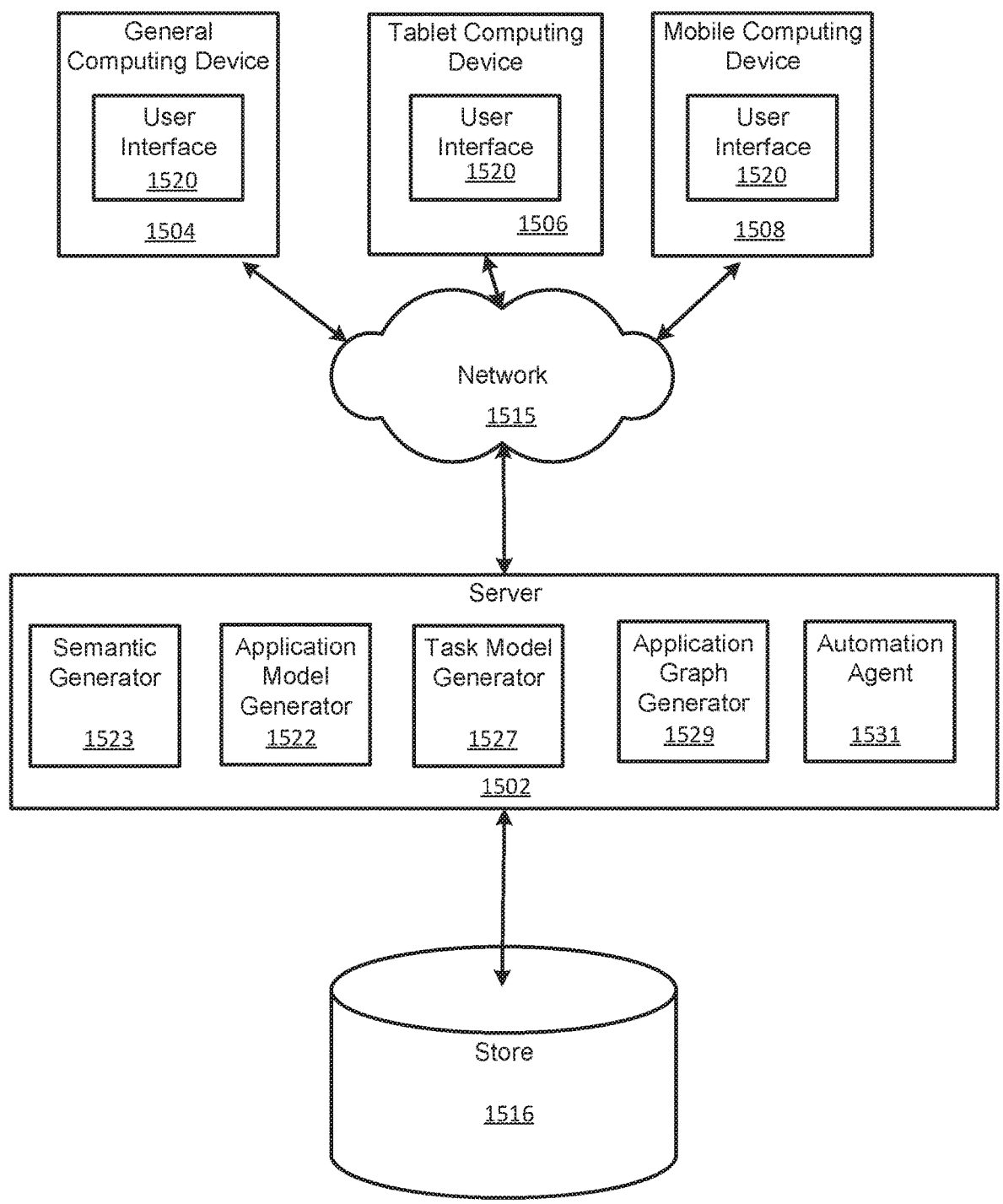
FIG. 15 illustrates at least one aspect of an architecture of a system for processing data in accordance with examples of the present disclosure.

FIGS. 13-15 and the associated descriptions provide a discussion of a variety of operating environments in which aspects of the disclosure may be practiced. However, the devices and systems illustrated and discussed with respect to FIGS. 13-15 are for purposes of example and illustration and are not limiting of a vast number of computing device configurations that may be utilized for practicing aspects of the disclosure, described herein.

FIG. 13 is a block diagram illustrating physical components (e.g., hardware) of a computing device 1300 with which aspects of the disclosure may be practiced. The computing device components described below may be suitable for the computing devices described above. In a basic configuration, the computing device 1300 may include at least one processing unit 1302 and a system memory 1304. Depending on the configuration and type of computing device, the system memory 1304 may comprise, but is not limited to, volatile storage (e.g., random access memory), non-volatile storage (e.g., read-only memory), flash memory, or any combination of such memories.

The system memory 1304 may include an operating system 1305 and one or more program modules 1306 suitable for running software applications 1320, such as but not limited to a semantic generator 1323, an action graph generator 1325, a task model generator 1327, an application graph generator 1329, an automation agent 1331, and/or one or more components supported by the systems described herein. For example, the semantic generator 1323 may generate a semantic representation of an application as described with respect to, but not limited to, at least FIG. 2, FIG. 4, FIG. 10, and FIG. 12 of the present disclosure. The action graph generator 1325 may generate an application model of an application as described with respect to, but not limited to, at least FIG. 2, FIG. 4, FIG. 10, and FIG. 12 of the present disclosure. The task model generator may generate a task model as described with respect to, but not limited to, at least FIG. 2, FIG. 6, FIG. 11, and FIG. 12 of the present disclosure. The action graph generator 1325 may generate an action graph as described with respect to, but not limited to, at least FIG. 2, FIG. 4, FIG. 6, FIG. 7, and FIG. 12 of the present disclosure. The automation agent 1331 may automate one or more aspects of the present disclosure. The automation agent 1331 may coordinate access to one or more programs or application of the computing device 1300.

The operating system 1305, for example, may be suitable for controlling the operation of the computing device 1300.

Furthermore, embodiments of the disclosure may be practiced in conjunction with a graphics library, other operating systems, or any other application program and is not limited to any particular application or system. This basic configuration is illustrated in FIG. 13 by those components within a dashed line 1308. The computing device 1300 may have additional features or functionality. For example, the computing device 1300 may also include additional data storage devices (removable and/or non-removable) such as, for example, magnetic disks, optical disks, or tape. Such additional storage is illustrated in FIG. 13 by a removable storage device 1309 and a non-removable storage device 1310.

As stated above, a number of program modules and data files may be stored in the system memory 1304. While executing on the at least one processing unit 1302, the program modules 1306 (e.g., application 1320) may perform processes including, but not limited to, one or more aspects, as described herein. Other program modules that may be used in accordance with aspects of the present disclosure may include electronic mail and contacts applications, word processing applications, spreadsheet applications, database applications, slide presentation applications, drawing or computer-aided application programs, etc., a semantic generator 1323, an action graph generator 1325, a task model generator 1327, an application graph generator 1329, an automation agent 1331, and/or one or more components supported by the systems described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 13 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1300 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1300 may also have one or more input device(s) 1312 such as a keyboard, a mouse, a pen, a sound or voice input device, a touch or swipe input device, etc. The output device(s) 1314A such as a display, speakers, a printer, etc. may also be included. An output 1314B, corresponding to a virtual display may also be included. The aforementioned devices are examples and others may be used. The computing device 1300 may include one or more communication connections 1316 allowing communications with other computing devices 1350. Examples of suitable communication connections 1316 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 13004, the removable storage device 1309, and the non-removable storage device 1310 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1300. Any such computer storage media may be part of the computing device 1300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 14A and 14B illustrate a computing device or mobile computing device 1400, for example, a mobile telephone, a smart phone, wearable computer (such as a smart watch), a tablet computer, a laptop computer, and the like, with which aspects of the disclosure may be practiced. With reference to FIG. 14A, one aspect of a mobile computing device 1400 for implementing the aspects is illustrated. In a basic configuration, the mobile computing device 1400 is a handheld computer having both input elements and output elements. The mobile computing device 1400 typically includes a display 1405 and one or more input buttons 1410 that allow the user to enter information into the mobile computing device 1400. The display 1405 of the mobile computing device 1400 may also function as an input device (e.g., a touch screen display). In some examples, the automation agent 1331, 106 may access a display buffer in order to obtain pixel data of the application currently being executed. The automation agent 1331 may be the same as or similar to the automation agent 106 as described herein. If included, an optional side input element 1415 allows further user input. The side input element 1415 may be a rotary switch, a button, or any other type of manual input element. In alternative aspects, mobile computing device 1400 may incorporate more or less input elements. For example, the display 1405 may not be a touch screen in some aspects. In yet another alternative aspect, the mobile computing device 1400 is a portable phone system, such as a cellular phone. The mobile computing device 1400 may also include an optional keypad 1435. Optional keypad 1435 may be a physical keypad or a "soft" keypad generated on the touch screen display. In various aspects, the output elements include the display 1405 for showing a graphical user interface (GUI), a visual indicator 1431 (e.g., a light emitting diode), and/or an audio transducer 1425 (e.g., a speaker). In some aspects, the mobile computing device 1400 incorporates a vibration transducer for providing the user with tactile feedback. In yet another aspect, the mobile computing device 1400 incorporates input and/or output ports, such as an audio input (e.g., a microphone jack), an audio output (e.g., a headphone jack), and a video output (e.g., a HDMI port) for sending signals to or receiving signals from an external source.

FIG. 14B is a block diagram illustrating the architecture of one aspect of computing device, a server, or a mobile computing device. That is, the computing device 1400 can incorporate a system (e.g., an architecture) 1402 to implement some aspects. The system 1402 can implemented as a "smart phone" capable of running one or more applications (e.g., browser, e-mail, calendaring, contact managers, messaging clients, games, and media clients/players). In some aspects, the system 1402 is integrated as a computing device, such as an integrated personal digital assistant (PDA) and wireless phone.

One or more application programs 1466 may be loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, a semantic generator 1323, an action graph generator 1325, a task model generator 1327, an application graph generator 1329, an automation agent 1331, and/or one or more components supported by the systems described herein. The system 1402 also includes a non-volatile storage area 1468 within the memory 1462. The non-volatile storage area 1468 may be used to store persistent information that should not be lost if the system 1402 is powered down. The application programs 1466 may use and store information in the non-volatile storage area 1468, such as e-mail or other messages used by an e-mail application, and the like. A synchronization application (not shown) also resides on the system 1402 and is programmed to interact with a corresponding synchronization application resident on a host computer to keep the information stored in the non-volatile storage area 1468 synchronized with corresponding information stored at the host computer. As should be appreciated, other applications may be loaded into the memory 1462 and run on the mobile computing device 1400 described herein (e.g., a semantic generator 1323, an action graph generator 1325, a task model generator 1327, an application graph generator 1329, an automation agent 1331, etc.).

The system 1402 has a power supply 1470, which may be implemented as one or more batteries. The power supply 1470 might further include an external power source, such as an AC adapter or a powered docking cradle that supplements or recharges the batteries.

The system 1402 may also include a radio interface layer 1472 that performs the function of transmitting and receiving radio frequency communications. The radio interface layer 1472 facilitates wireless connectivity between the system 1402 and the "outside world," via a communications carrier or service provider. Transmissions to and from the radio interface layer 1472 are conducted under control of the operating system 1464. In other words, communications received by the radio interface layer 1472 may be disseminated to the application programs 1466 via the operating system 1464, and vice versa.

The visual indicator 1420 may be used to provide visual notifications, and/or an audio interface 1474 may be used for producing audible notifications via the audio transducer 1425. In the illustrated configuration, the visual indicator 1420 is a light emitting diode (LED) and the audio transducer 1425 is a speaker. These devices may be directly coupled to the power supply 1470 so that when activated, they remain on for a duration dictated by the notification mechanism even though the processor 1460 and other components might shut down for conserving battery power. The LED may be programmed to remain on indefinitely until the user takes action to indicate the powered-on status of the device. The audio interface 1474 is used to provide audible signals to and receive audible signals from the user. For example, in addition to being coupled to the audio transducer 1425, the audio interface 1474 may also be coupled to a microphone to receive audible input, such as to facilitate a telephone conversation. In accordance with aspects of the present disclosure, the microphone may also serve as an audio sensor to facilitate control of notifications, as will be described below. The system 1402 may further include a video interface 1476 that enables an operation of an on-board camera to record still images, video stream, and the like.

A mobile computing device 1400 implementing the system 1402 may have additional features or functionality. For example, the mobile computing device 1400 may also include additional data storage devices (removable and/or non-removable) such as, magnetic disks, optical disks, or tape. Such additional storage is illustrated in FIG. 14B by the non-volatile storage area 968.

Data/information generated or captured by the mobile computing device 1400 and stored via the system 402 may be stored locally on the mobile computing device 1400, as described above, or the data may be stored on any number of storage media that may be accessed by the device via the radio interface layer 1472 or via a wired connection between the mobile computing device 400 and a separate computing device associated with the mobile computing device 1400, for example, a server computer in a distributed computing network, such as the Internet. As should be appreciated such data/information may be accessed via the mobile computing device 1400 via the radio interface layer 1472 or via a distributed computing network. Similarly, such data/information may be readily transferred between computing devices for storage and use according to well-known data/information transfer and storage means, including electronic mail and collaborative data/information sharing systems.

FIG. 15 illustrates one aspect of the architecture of a system for processing data received at a computing system from a remote source, such as a personal computer 1504, tablet computing device 1506, or mobile computing device 1508, as described above. Content displayed at server device 1502 may be stored in different communication channels or other storage types. For example, application models may be stored using the application model generator 1522, task models may be stored using the task model generator 1527, application graphs may be generated and stored using the application graph generator 1529, and one or more semantic representations may be generated and stored using the semantic generator 1523.

A semantic generator 1523, an application model generator 1522, a task model generator 1527, an application graph generator 1529, an automation agent 1531, and/or one or more components supported by the systems described herein may be employed by a client that communicates with server device 1502. In some aspects, one or more of a semantic generator 1523, an application model generator 1522, a task model generator 1527, an application graph generator 1529, and an automation agent 1531 may be employed by server device 1502. The server device 1502 may provide data to and from a client computing device such as a personal computer 1504, a tablet computing device 1506 and/or a mobile computing device 1508 (e.g., a smart phone) through a network 1515. By way of example, the computer system described above may be embodied in a personal computer 1504, a tablet computing device 1506 and/or a mobile computing device 1508 (e.g., a smart phone). Any of these embodiments of the computing devices may obtain content from the store 1516, in addition to receiving graphical data useable to be either pre-processed at a graphic-originating system, or post-processed at a receiving computing system. The store 1516 may refer to, one or more of the storage locations 216, 228, and/or 236. The automation agent 1531 may be the same as or similar to the automation agent 106 as described herein.

FIG. 15 illustrates an exemplary mobile computing device 1500 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

In accordance with at least one examples of the present disclosure, a system is provided. The system may include a processor and memory including instructions which when executed by the processor, causes the processor to: receive input data; determine a task intent from the input data; obtain a task model based on the task intent; select an application based on the task intent; and generate an action graph based on the selected application, wherein the action graph includes information in a structured format specifying how to perform an interaction with a user interface of the selected application utilizing information extracted from the input data.

At least one aspect of the above system includes where the user interface is output to a display of a mobile device. At least one aspect of the above system includes where the instructions cause the processor to: determine that one or more subtasks of the task model lacks required information; obtain a second task model based on a second task intent associated with the one or more subtasks; select a second application based on the second task intent; generate a second action graph, wherein the second action graph includes information in a structured format specifying how to interact with a user interface of the selected second application output to the display of the mobile device; and obtain the required information from the selected second application by interacting with the user interface of the selected second application output to the display of the mobile device. At least one aspect of the above system includes where the action graph includes the required information and the instructions cause the processor to input the required information into a text input element of the user interface output to the display of the mobile device. At least one aspect of the above system includes where the display of the mobile device is a virtual display. At least one aspect of the above system includes where the instructions cause the processor to: receive an application model specific to the selected application, the application model including structured data indicating one or more elements, flows, and/or objects comprising a user interface generated by the selected application; and generate the action graph based on the application model. At least one aspect of the above system includes where the instruction cause the processor to: retrieve information from a data store; and populate the action graph utilizing the retrieved information. At least one aspect of the above system includes where the instructions cause the processor to: determine that the action graph lacks required information; obtain a second task model based on a second task intent associated with the required information; select a second application based on the second task intent; generate a second action graph, wherein the second action graph includes information in a structured format specifying how to interact with a user interface of the selected second application output to the display of the mobile device; and obtain the required information from the selected second application by interacting with the user interface of the selected second application output to the display of the mobile device. At least one aspect of the above system includes where the instructions cause the processor to: generate a semantic representation of a user interface generated by the selected application, wherein the semantic representation of the user interface includes data in a structured format describing characteristics of one or more elements comprising the user interface; generate the application model for the selected application utilizing a machine learning model trained to generate application models based on semantic representations; and store the application model in a data store. At least one aspect of the above system includes where the instructions cause the processor to: receive pixel data associated with the user interface of the selected application, wherein the pixel data is obtained from a display buffer of the mobile device.

In accordance with at least one example of the present disclosure, a method is provided. The method may include receiving input data; determining a task intent from the input data; obtaining a task model based on the task intent; selecting an application based on the task intent; and generating an action graph based on the selected application, wherein the action graph includes information in a structured format specifying how to perform an interaction with a user interface of the selected application utilizing information extracted from the input data. At least one aspect of the above method includes where the user interface is output to a display of a mobile device. At least one aspect of the above method includes determining that one or more subtasks of the task model lacks required information; obtaining a second task model based on a second task intent associated with the one or more subtasks; selecting a second application based on the second task intent; generating a second action graph, wherein the second action graph includes information in a structured format specifying how to interact with a user interface of the selected second application output to the display of the mobile device; and obtaining the required information from the selected second application by interacting with the user interface of the selected second application output to the display of the mobile device. At least one aspect of the above method includes where the action graph includes the required information and the instructions cause the processor to input the required information into a text input element of the user interface output to the display of the mobile device. At least one aspect of the above method includes receiving an application model specific to the selected application, the application model including structured data indicating one or more elements, flows, and/or objects comprising a user interface generated by the selected application; and generating the action graph based on the application model. At least one aspect of the above method includes retrieving information from a data store; and populating the action graph utilizing the retrieved information. At least one aspect of the above method includes determining that the action graph lacks required information; obtaining a second task model based on a second task intent associated with the required information; selecting a second application based on the second task intent; generating a second action graph, wherein the second action graph includes information in a structured format specifying how to interact with a user interface of the selected second application output to the display of the mobile device; and obtaining the required information from the selected second application by interacting with the user interface of the selected second application output to the display of the mobile device. At least one aspect of the above method includes generating a semantic representation of a user interface generated by the selected application, wherein the semantic representation of the user interface includes data in a structured format describing characteristics of one or more elements comprising the user interface; generating the application model for the selected application utilizing a machine learning model trained to generate application models based on semantic representations; and storing the application model in a data store.

In accordance with examples of the present disclosure, a method is provided. The method may include generating a semantic representation of a user interface generated by an application, wherein the semantic representation of the user interface includes data in a structured format describing characteristics of one or more elements comprising the user interface; generating an application model for the application utilizing a machine learning model trained to generate application models based on semantic representations; storing the application model in a data store; retrieving the application model; retrieving information from a data store; generating an action graph based on the application model, wherein the action graph includes information in a structured format specifying how to perform an interaction with a user interface of an application associated with the application model; and populating the action graph utilizing the retrieved information.

At least one aspect of the above method includes obtaining pixel data associated with the user interface; performing an optical character recognition process on the pixel data associated with the user interface; and extracting characteristics of the one or more elements comprising the user interface.

While illustrative examples of the disclosure have been described in detail herein, it is to be understood that the inventive concepts may be otherwise variously embodied and employed, and any appended claims are intended to be construed to include such variations, except as limited by the prior art.

The invention claimed is:

1. A system for automating a task, the system comprising:
a processor; and
memory including instructions which when executed by the processor, causes the processor to:
receive input data;
select a first application based on a first task intent identified from the input data;
generate one or more semantic representations of user interfaces generated by the selected first application and output to a display of a mobile device, wherein the one or more semantic representations of the user interfaces generated by the selected first application include data in a structured format describing characteristics of one or more elements comprising the user interfaces generated by the selected first application;
generate, by the machine learning model, a first application model for the selected first application based on the one or more semantic representations of the user interfaces generated by the selected first application, wherein the machine learning model is a machine learning model trained to generate application models based on semantic representations, and wherein the first application model includes structured data including at least one of the one or more elements comprising the user interfaces generated by the selected first application and one or more flows of the selected first application;
generate a first action graph based on the first application model, wherein the first action graph includes information in a structured format specifying how to perform interactions with the one or more elements of the user interfaces generated by the selected first application;
determine that the first action graph is missing information;
select a second application based on a second task intent identified from the missing information;
generate one or more semantic representations of user interfaces generated by the selected second application and output to the display of the mobile device, wherein the one or more semantic representations of the user interfaces generated by the selected second application includes data in a structured format describing characteristics of one or more elements comprising the user interfaces generated by the selected second application;
generate, by the machine learning model, a second application model for the selected second application based on the one or more semantic representations of the user interfaces generated by the selected second application, wherein the second application model includes structured data including at least one of the one or more elements comprising the user interfaces generated by the selected second application and one or more flows of the selected second application;

generate a second action graph based on the second application model, wherein the second action graph includes information in a structured format specifying how to perform interactions with the one or more elements of the user interfaces generated by the selected second application; and obtain the missing information from the selected second application by interacting with the user interfaces generated by the selected second application and output to the display of the mobile device by:

obtaining pixel data associated with a first user interface of the user interfaces by the second selected application;

performing an optical character recognition process on the pixel data associated with the first user interface;

extracting characteristics of one or more elements comprising the first user interface, the characteristics including a position and size of text recognized by performance of the optical character recognition process on the pixel data associated with the first user interface;

updating the second action graph to include each extracted characteristic of the one or more elements as a node, each node arranged in a hierarchical fashion; and populating the missing information based on the extracted characteristics and the updated second action graph.

2. The system of claim 1, wherein the instructions cause the processor to:

determine that one or more subtasks of a first task model associated with the first task intent lack required information; and obtain a second task model based on a second task intent associated with the one or more subtasks.

3. The system of claim 2, wherein the first action graph includes the required information and the instructions cause the processor to input the required information into a text input element of a first user interface output to the display of the mobile device.

4. The system of claim 1, wherein the display of the mobile device is a virtual display.

5. The system of claim 1, wherein the instruction cause the processor to:

retrieve information from a data store; and populate the first action graph utilizing the retrieved information.

6. The system of claim 1, wherein the instructions cause the processor to:

store the first application model in a data store.

7. The system of claim 6, wherein the instructions cause the processor to:

receive pixel data associated with the first user interface generated by the selected first application, wherein the pixel data is obtained from a display buffer of the mobile device.

8. The system of claim 1, wherein the instructions cause the processor to:

determine that the first action graph is missing second information;

determine that the second action graph is missing third information; and generate a third user interface and output the third user interface to the display of the mobile device, wherein the third user interface provides one or more display elements for receiving the missing second information and the missing third information.

9. A method comprising:

receiving input data;

selecting a first application based on a first task intent identified from the input data;

generating one or more semantic representations of user interfaces generated by the selected first application and output to a display of a mobile device, wherein the one or more semantic representations of the user interfaces generated by the selected first application include data in a structured format describing characteristics of one or more elements comprising the user interfaces generated by the selected first application;

generating, by the machine learning model, a first application model for the selected first application based on the one or more semantic representations of the user interfaces generated by the selected first application, wherein the machine learning model is a machine learning model trained to generate application models based on semantic representations, and wherein the first application model includes structured data including at least one of the one or more elements comprising the user interfaces generated by the selected first application and one or more flows of the selected first application;

generating a first action graph based on the first application model, wherein the first action graph includes information in a structured format specifying how to perform interactions with the one or more elements of the user interfaces generated by the selected first application;

determining that the first action graph is missing information;

selecting a second application based on a second task intent identified from the missing information;

generating one or more semantic representations of user interfaces generated by the selected second application and output to the display of the mobile device, wherein the one or more semantic representations of the user interfaces generated by the selected second application includes data in a structured format describing characteristics of one or more elements comprising the user interfaces generated by the selected second application;

generating, by the machine learning model, a second application model for the selected second application based on the one or more semantic representations of the user interfaces generated by the selected second application, wherein the second application model includes structured data including at least one of the one or more elements comprising the user interfaces generated by the selected second application and one or more flows of the selected second application;

generating a second action graph based on the second application model, wherein the second action graph includes information in a structured format specifying how to perform interactions with the one or more elements of the user interfaces generated by the selected second application; and obtaining the missing information from the selected second application by interacting with the user interfaces generated by the selected second application and output to the display of the mobile device by:

obtaining pixel data associated with a first user interface of the user interfaces by the second selected application;

performing an optical character recognition process on the pixel data associated with the first user interface;

extracting characteristics of one or more elements comprising the first user interface, the characteristics including a position and size of text recognized by performance of the optical character recognition process on the pixel data associated with the first user interface;

updating the second action graph to include each extracted characteristic of the one or more elements as a node, each node arranged in a hierarchical fashion; and populating the missing information based on the extracted characteristics and the updated second action graph.

10. The method of claim 9, further comprising:

determining that one or more subtasks of a first task model associated with the first task intent lack required information; and obtaining a second task model based on the second task intent associated with the one or more subtasks.

11. The method of claim 10, wherein the first action graph includes the required information and the required information is received at a text input element of a first user interface that is output to the display of the mobile device.

12. The method claim 9, further comprising:

retrieving information from a data store; and populating the first action graph utilizing the retrieved information.

13. The method of claim 9, further comprising:

storing the application model in a data store.

14. A method for automating a task, the method comprising:

receiving a selection of a first application;

generating one or more semantic representations of a user interface generated by the selected first application and output to a display of a mobile device, wherein the one or more semantic representations of the user interface generated by the selected first application includes data in a structured format describing characteristics of one or more elements comprising the user interface generated by the selected first application;

generating, by the machine learning model, a first application model for the selected first application based on the one or more semantic representations of the user interface generated by the selected first application, wherein the machine learning model is a machine learning model trained to generate application models based on semantic representations, and wherein the first application model includes structured data describing at least one of the one or more elements comprising the user interface generated by the selected first application and one or more flows of the selected first application;

storing the first application model in a data store;

retrieving the first application model;

generating a first action graph based on the first application model, wherein the first action graph includes information in a structured format specifying how to perform interactions with the one or more elements of the user interface generated by the selected first application;

populating the first action graph with information;

determining that the first action graph is missing information;

selecting a second application based on a task intent identified from the missing information;

generating one or more semantic representations of a user interface generated by the selected second application and output to the display of the mobile device, wherein the one or more semantic representations of the user interface generated by the selected second application includes data in a structured format describing characteristics of one or more elements comprising the user interface generated by the selected second application;

generating, by the machine learning model, a second application model for the selected second application based on the one or more semantic representations of the user interface generated by the selected second application, wherein the second application model includes structured data including at least one of the one or more elements comprising the user interface generated by the selected second application and one or more flows of the selected second application;

generating a second action graph based on the second application model, wherein the second action graph includes information in a structured format specifying how to perform interactions with the one or more elements of the user interface generated by the selected second application; and obtaining the missing information from the selected second application by interacting with the user interface generated by the selected second application and output to the display of the mobile device by:

obtaining pixel data associated with a first user interface of the user interfaces by the second selected application;

performing an optical character recognition process on the pixel data associated with the first user interface;

extracting characteristics of one or more elements comprising the first user interface, the characteristics including a position and size of text recognized by performance of the optical character recognition process on the pixel data associated with the first user interface;

updating the second action graph to include each extracted characteristic of the one or more elements as a node, each node arranged in a hierarchical fashion; and populating the missing information based on the extracted characteristics and the updated second action graph.

* * * * *